US012346485B2

(12) United States Patent
Haddon et al.

(10) Patent No.: US 12,346,485 B2
(45) Date of Patent: Jul. 1, 2025

(54) ERROR DETECTION IN CONVOLUTIONAL OPERATIONS

(71) Applicant: Arm Limited, Cambridge (GB)

(72) Inventors: Matthew David Haddon, Bishop's Stortford (GB); Igor Fedorov, Ashland, MA (US); Reiley Jeyapaul, Haverhill (GB); Paul Nicholas Whatmough, Cambridge, MA (US); Zhi-Gang Liu, Westford, MA (US)

(73) Assignee: Arm Limited, Cambridge (GB)

( * ) Notice: Subject to any disclaimer, the term of this patent is extended or adjusted under 35 U.S.C. 154(b) by 177 days.

(21) Appl. No.: 17/812,834

(22) Filed: Jul. 15, 2022

(65) Prior Publication Data

US 2024/0020419 A1    Jan. 18, 2024

(51) Int. Cl.
  *G06F 21/64*    (2013.01)
  *G06F 16/22*    (2019.01)
  *G06F 16/23*    (2019.01)

(52) U.S. Cl.
  CPC .......... *G06F 21/64* (2013.01); *G06F 16/2264* (2019.01); *G06F 16/2365* (2019.01)

(58) Field of Classification Search
  CPC ... G06F 21/64; G06F 16/2365; G06F 16/2264
  See application file for complete search history.

(56) References Cited

U.S. PATENT DOCUMENTS

| 7,036,059 B1 * | 4/2006 | Carmichael | G06F 11/106 |
| | | | 714/725 |
| 11,507,452 B1 * | 11/2022 | Yoon | G06F 11/1004 |
| 2017/0257186 A1 * | 9/2017 | Ge | H04L 1/0061 |
| 2021/0182670 A1 * | 6/2021 | Kim | G06N 3/08 |
| 2021/0312585 A1 * | 10/2021 | Long | G06F 9/5061 |
| 2022/0050927 A1 * | 2/2022 | Urian | H04L 9/3093 |
| 2023/0062307 A1 * | 3/2023 | Ramsl | G06F 16/166 |

OTHER PUBLICATIONS

"Filippas Dionysios et al: ""Low-Cost Online Convolution Checksum Checker"" IEEE Transactions on Very Large Scaleintegration (VLSI) Systems, [Online]vol. 30, No. 2, Feb. 1, 2022 (Feb. 1, 2022), pp. 201-212, XP093091570, Piscataway, NJ, USAISSN: 1063-8210, DOI: 10.1109/TVLSI.2021.3119511Retrieved from the Internet: URL:https://gdimitrak.github.io/papers/tvlsi21.pdf>".

(Continued)

*Primary Examiner* — Jensen Hu
(74) *Attorney, Agent, or Firm* — EIP US LLP

(57) ABSTRACT

Methods and systems for detecting errors when performing a convolutional operation is provided. Predicted checksum data, corresponding to input checksum data and kernel checksum data, is obtained. The convolutional operation is performed to obtain an output feature map. Output checksum data is generated and the predicted checksum data and the output checksum data are compared, the comparing taking account of partial predicted checksum data configured to correct for a lack of padding when performing the convolution operation, wherein the partial predicted checksum data corresponds to input checksum data for a subset of the values in the input feature map and kernel checksum data for a subset of the values in the kernel.

20 Claims, 17 Drawing Sheets

(56) References Cited

OTHER PUBLICATIONS

"Marty Thibaut et al: ""Safe Overclockingfor CNN Accelerators ThroughAlgorithm-Level Error Detection"", IEEE Transactions on Computer-Aided Designof Integrated Circuits and Systems, IEEE, USA, vol. 39, No. 12,Mar. 16, 2020 (Mar. 16, 2020), pp. 4777-4790, XP011821107,ISSN: 0278-0070, DOI:10.1109/TCAD.2020.2981056".
International Search Report and Written Opinion dated Oct. 24, 2023 for PCT Application No. PCT/GB2023/051861.
Zhao, Kai et al; FT-CNN: Algorithm-Based Fault Tolerance for Convolutional Neural Networks; Sep. 7, 2020; IEEE Transactions on Parallel and Distributed Systems, 2020.
Hari, Siva Kumar Sastry et al; Making Convolutions Resilient via Algorithm-Based Error Detection Techniques; IEEE, Jun. 8, 2020.
Filippas, Dionysios et al; Low-Cost Online Convolution Checksum Checker; IEEE Transactions on very Large Scale Integration (VLSI) Systems; 2021 IEEE.
Kosaian, Jack et al; Arithmetic-Intensity—Guided Fault Tolerance for Neural Network Inference on GPUs; Dec. 7, 2021; SC '21, Nov. 14-19, 2021, St. Louis, MO, USA.

\* cited by examiner

ERROR DETECTION IN CONVOLUTIONAL OPERATIONS

BACKGROUND OF THE INVENTION

Field of the Invention

The present disclosure relates to data processing. In particular, but not exclusively, the present disclosure relates to error detection when performing machine learning operations.

Description of the Related Technology

Neural networks have emerged as powerful tools for image processing, inference, machine learning, and related tasks. Processing data using a neural network generally involves a large number of multiply-accumulate (MAC) operations. For example, Convolutional Neural Network (CNN) architectures typically include multiple convolutional layers, each of which generates a feature map via convolutions between a data array and one or more kernels. Each feature map contains multiple elements, where each element is computed via a series of MAC operations between a subset of elements of the data array and respective weight values of a kernel. Neural networks may also comprise other layer types, for example, Fully Connected (FC) layers, Deconvolution layers, Recurrent layers, and so forth.

Processors which are configured to implement convolutional neural networks, such as neural processing units (NPUs) and other custom processors specifically adapted for CNN computations, as well as more generalized processors able to perform CNN computations, including central processing units (CPUs), graphical processing units (GPUs), digital signal processors (DSPs), etc., may generally have on-board storage, for example in the form of static random-access memory (SRAM). Data for implementing neural networks may be loaded onto the processor and stored in storage, such as flash memory, in the processor before being used to implement the neural network.

Errors can occur when implementing neural networks due to handling and storage of data. A soft error is a type of error which occurs when a bit value, or multiple bit value, of data is incorrectly flipped. Soft errors may be caused by defects, broken components, and/or single event upsets such as from cosmic rays and other forms of radiation. Soft errors can occur on data stored in storage attached to, or integrated with, a processor.

SUMMARY

According to a first aspect, there is provided a computer-implemented method for detecting errors when performing a convolutional operation that involves convolving an input feature map comprising a first set of values represented in a first multi-dimensional array with a kernel comprising a second set of values represented in a second multi-dimensional array, the computer-implemented method comprising: obtaining predicted checksum data corresponding to input checksum data for the first set of values and kernel checksum data for the second set of values; performing the convolution operation to generate an output feature map comprising a third set of values; generating output checksum data for the third set of values; and comparing the predicted checksum data with the output checksum data, the comparing taking account of partial predicted checksum data configured to correct for a lack of padding when performing the convolution operation, wherein the partial predicted checksum data corresponds to input checksum data for a subset of the first set of values and kernel checksum data for a subset of the second set of values.

According to a second aspect, there is provided a data processing system comprising one or more compute modules for performing convolutions between an input feature map comprising a first set of values represented in a first multi-dimensional array and a kernel comprising a second set of values represented in a second multi-dimensional array, the data processing system being configured to: obtain predicted checksum data corresponding to input checksum data for the first set of values and kernel checksum data for the second set of values; perform a convolution operation on the input feature map with the kernel using the compute modules to obtain an output feature map comprising a third set of values; generate output checksum data for the third set of values; and compare the predicted checksum data with the output checksum data, the comparing taking account of partial predicted checksum data configured to correct for a lack of padding when performing the convolution operation, wherein the partial predicted checksum data corresponds to input checksum data for a subset of the first set of values and kernel checksum data for a subset of the second set of values.

According to a third aspect, there is provided A non-transitory computer-readable storage medium comprising computer-executable instructions which, when executed by one or more processors, cause the one or more processors to: obtain an input feature map comprising a first set of values represented in a first multi-dimensional array and a kernel comprising a second set of values represented in a second multi-dimensional array, wherein the input feature map is associated with input checksum data and the kernel is associated with kernel checksum data; obtain predicted checksum data corresponding to the input checksum data and the kernel checksum data; perform a convolution operation on the input feature map with the kernel to obtain an output feature map comprising a third set of values; generate output checksum data for the third set of values; and compare the predicted checksum data with the output checksum data, the comparing taking account of partial predicted checksum data configured to correct for a lack of padding when performing the convolution operation, wherein the partial predicted checksum data corresponds to input checksum data for a subset of the first set of values and kernel checksum data for a subset of the second set of values.

DETAILED DESCRIPTION OF CERTAIN
INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Certain examples described herein provide methods, and systems, for detecting errors when performing convolution operations, for example, when implementing a convolutional neural network. The methods described herein allow for error detection to be performed on a per layer basis when performing convolution operations to implement a neural network while mitigating an increase in computational expense that might otherwise make per layer error detection infeasible for certain applications. As such, the methods and systems described herein are particularly suitable for safety critical implementations in which detecting errors quickly, if possible before said errors are propagated throughout subsequent layers of the neural network, is of importance.

Figure 1:
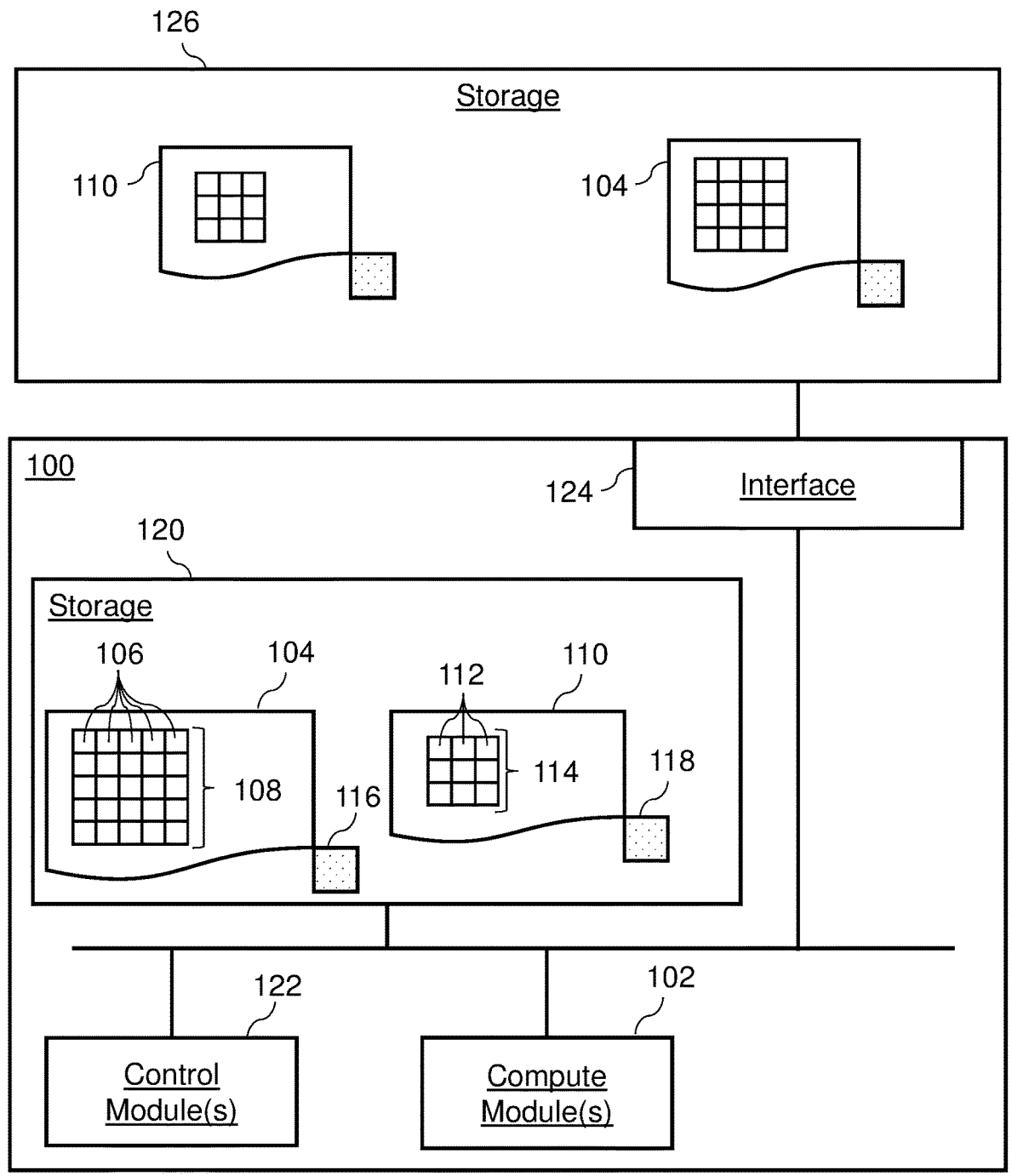
FIG. 1 is a schematic diagram showing a data processing system according to examples.

FIG. 1 shows an example of a data processing system 100 for implementing neural networks. The data processing system 100 may be comprised in a computing device. For example, the data processing system 100 may be part of a handheld computing device such as a smartphone, tablet device or general-purpose laptop computer. In such examples, the data processing system 100 may be used to implement a CNN, or at least one layer of a CNN, using data obtained by the computing device. Data which can be obtained by a computing device depends on the functionality of the device and sensors which are comprised in the device. This data may include image data, audio data, telemetry data, accelerometer data, global positioning system data, magnetometer data, light sensor data, fingerprint reader data, any other data which may be collected by a local sensor comprised in or on the computing device, or any data receivable over a local or wide area network through wired or wireless communication interfaces comprised in the computing device. Alternatively, the data processing system 100 may be used in another type of computing device, for example a computing device used in an autonomous vehicle, or in a robotics application where the CNN is used to process control data, sensory feedback data, or to provide any other suitable information processing.

The data processing system 100 may be implemented as a processor, or collection of processors, configured to perform convolution operations. For example, the data processing system 100 may be implemented using an NPU, or other custom processor specifically adapted for implementing convolutional neural network. Alternatively, or additionally, more generalized processors such as GPUs, CPUs, DSP, or any combination of these processors, may be used to implement the data processing system 100.

The data processing system 100 comprises one or more compute modules 102 for performing convolutions between an input feature map 104, comprising a first set of values 106 represented in a first multi-dimensional array 108, and a kernel 110, comprising a second set of values 112 represented in a second multi-dimensional array 114. Only some of the first set of values 106 and second set of values 112 are labelled in the figures for simplicity. The compute modules 102 of the data processing system 100 may be used to perform multiplication and accumulation operations when implementing a convolutional neural network. The compute modules 103 may also be referred to as MACs (Multiply ACcumulate modules). Convolutional neural networks often comprise a plurality of layers in which an input feature map 104 is convolved with one or more kernels 110 to obtain an output feature map (not shown in FIG. 1). The output feature map of a given layer may be used as an input feature map 104 of a subsequent layer.

The first and second multi-dimensional arrays 108 and 114 shown in the figures and described throughout are two-dimensional arrays, however, it will be appreciated that three-dimensional arrays may also be used, or four-dimensional arrays, called tensors may be used. For example, in image processing an input feature map may comprise a two-dimensional image, that is represented as a three-dimensional array in which elements in the array each represent a pixel intensity value having a respective position, according to a height and width, and corresponding to one of a plurality of channels, such as red, green, and blue. In the examples described herein, and shown in the figures, two-dimensional arrays are used, although, it is to be appreciated that the methods described below are also applicable to higher dimensional arrays and/or may be applied per channel on an input feature map, treating each channel as a two-dimensional array.

Where a four-dimensional array is used, the fourth dimension may correspond to different inferences implemented by the machine learning method being applied. A multi-dimensional array may be represented in a computing device as a set of linear arrays which are associated in a specific order. Multi-dimensional arrays may also be referred to matrices. The convolutional operation will be discussed further below with respect to FIG. 2A and FIG. 2B.

The first set of values 106 may be associated with input checksum data 116. The input checksum data 116 may represent a checksum, or input checksum, of the first set of values 106. In some examples, the checksum represented in the input checksum data 116 may be generated by summing all of the first set of values 106, although, other checksum algorithms may also be possible for generating the checksum represented by the checksum data 116. The input checksum data 116 may not rely on all of the first set of values 106 for the checksum represented therein. For example, it may be sufficient to use a subset of the first set of values 106 to generate a suitable checksum.

The second set of values 112 may be associated with kernel checksum data 118. The kernel checksum data 118 may represent a checksum of the second set of values 112. In some examples, the checksum represented in the kernel checksum data 118 may be generated by summing all of the second set of values 112, although, other checksum algorithms may also be possible for generating the checksum represented by the checksum data 118. The kernel checksum data 118 may not rely on all of the second set of values 112 for the checksum represented therein. For example, it may be sufficient to use a subset of the second set of values 112 to generate a suitable checksum.

In the example shown in FIG. 1 the input feature map 104 and kernel 110 are stored in storage 120 in the data processing system 100. The storage 120 may also be referred to as a cache and is generally used to store data which is to be processed using the compute modules 102. Storing data in the storage 120 which is included in the data processing system 100 provides faster memory access and writing speeds compared to accessing storage 126 which is separate to the data processing system 100. The storage 120 used in the data processing system 100 may be volatile storage such as SRAM which provides faster access and writing than some other types of storage, such as read-only memory (ROM). The data processing system 100 may comprise one or more control modules 122 which are configured to instruct the other components in the data processing system 100 to perform certain functions.

In the example shown in FIG. 1 the data processing system 100 comprises an interface 124 for accessing storage 126 which is external to the data processing system 100. The interface 124 may be used when loading data from the external storage 126 onto the storage 120 included in the data processing system 100, or when loading data from the external storage 126 which is to be directly processed by the compute module(s) 102.

Figure 2A:
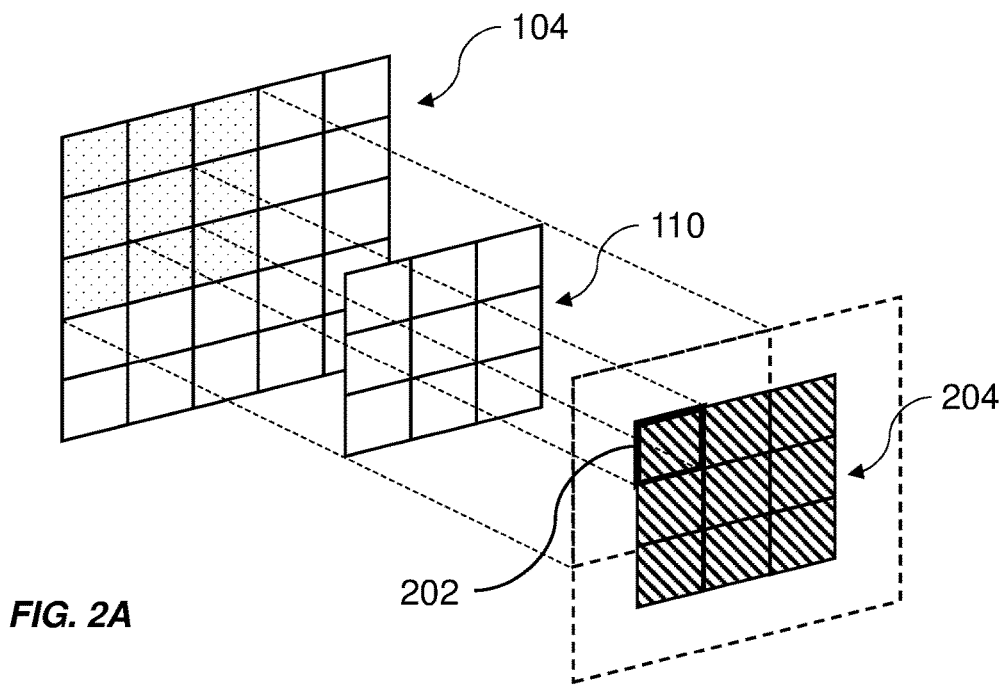
FIG. 2A is a schematic diagram showing a convolution operation performed without the use of padding.

FIG. 2A shows an example of a convolution operation. Performing the convolution operation includes overlaying, or aligning, the second set of values 112 of the kernel 110 with at least some of the first set of values 106 of the input feature map 104. Values in the kernel 110 are multiplied with their spatially corresponding values in the input feature map 104, and the results are accumulated to generate a single output value 202 which takes a respective position in an output feature map 204. If the input feature map 104 is larger than the kernel 110, then the kernel 110 may be spatially shifted, either horizontally or vertically, and the process of multiplying corresponding values and accumulating the result may be repeated. The amount by which the kernel 110 is shifted may be referred to as the stride, wherein the stride can be assigned an integer value which represents the number of values in the input feature map 104 by which the kernel 110 is shifted after each multiply and accumulate operation. The process may then be repeated until the kernel 110 has been aligned with the input feature map 104 at all available positions, according to the stride.

The size of the output feature map 204 is generally dependent on the size of the input feature map 104, the size of the kernel 110, and the stride. Where the kernel 110 is smaller than the input feature map 104, the size of the output feature map 304 will generally be smaller than the input feature map 304. In FIG. 2A a 5×5 input feature map convolved with a 3×3 kernel and using a stride of 1 produces a 3×3 output feature map 204. In some cases, the reduction in the size of the data in the output feature map 204 may be desirable as it means that the size of the data output from the convolution is reduced which in turn can reduce the computational expense to process, move, store, or otherwise manipulate the output feature map 204. In hidden layers of neural networks it is not uncommon for the size of a dataset to grow and shrink between different layers of the neural network. Although, in some cases, padding may be used to mitigate reduction in the size of the output feature map 204 as compared to the input feature map 104. Padding that is added to maintain the size and dimensionality of an input feature map 104 in the output feature map 204 may be referred to as "SAME" padding.

Figure 2B:
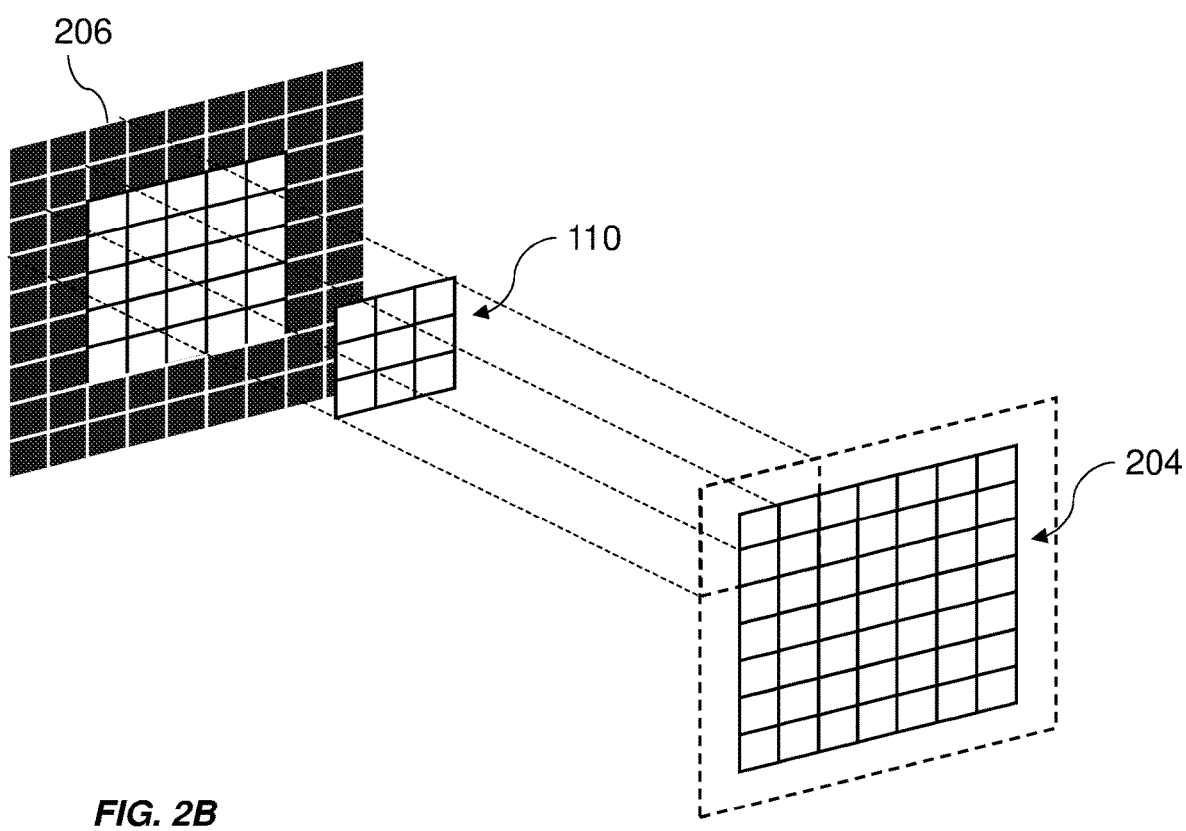
FIG. 2B is a schematic diagram showing a convolution operation in which padding is used.

FIG. 2B shows an example in which padding 206 is provided on the edges of the input feature map 104. The padding 206, when used, comprises a set of zero values which are located adjacent to and arranged along, or on, the edges of the input feature map 104. The padding 206 allows the kernel 110 to take a position which partially overlaps the input feature map 104, in particular overlapping some of the values along the edge of the input feature map 104 and also overlapping the padding 206. As such, more multiply accumulate operations can be performed along the edges of the input feature 104 with the kernel 110 to increase the size of the output feature map 204.

The size of the padding 206, for example, the number of zero values and/or the number of layers of these zero values which are arranged along the edges of the input feature map 104 may depend on the size of the kernel 110 and the stride. In the present example, the stride is 1, and the number of layers of padding which are provided on the edges is equal to k−1 where k corresponds to a number of values arranged along a corresponding edge of the kernel 110. In the example shown in FIG. 2B, the kernel 110 comprises nine values arranged in a 3×3 two-dimensional array and so k is equal to 3, and k−1=2 layers of zero values are provided on the edge of the input feature map 104 for the padding 206. In some cases, different amounts of padding may be added to different sides of the input feature map 104 depending on the shape and dimensions of the kernel 110. For example where the kernel 110 is represented by a 2×3 array of values, more padding may be used on two opposing edges of the input feature map 104 than the two other, edges of the input feature map 104 that are perpendicular to the two opposing edges of the input feature map 104. The padding 206 shown in FIG. 2B may be referred to as k−1 padding, or full padding.

Figure 3:
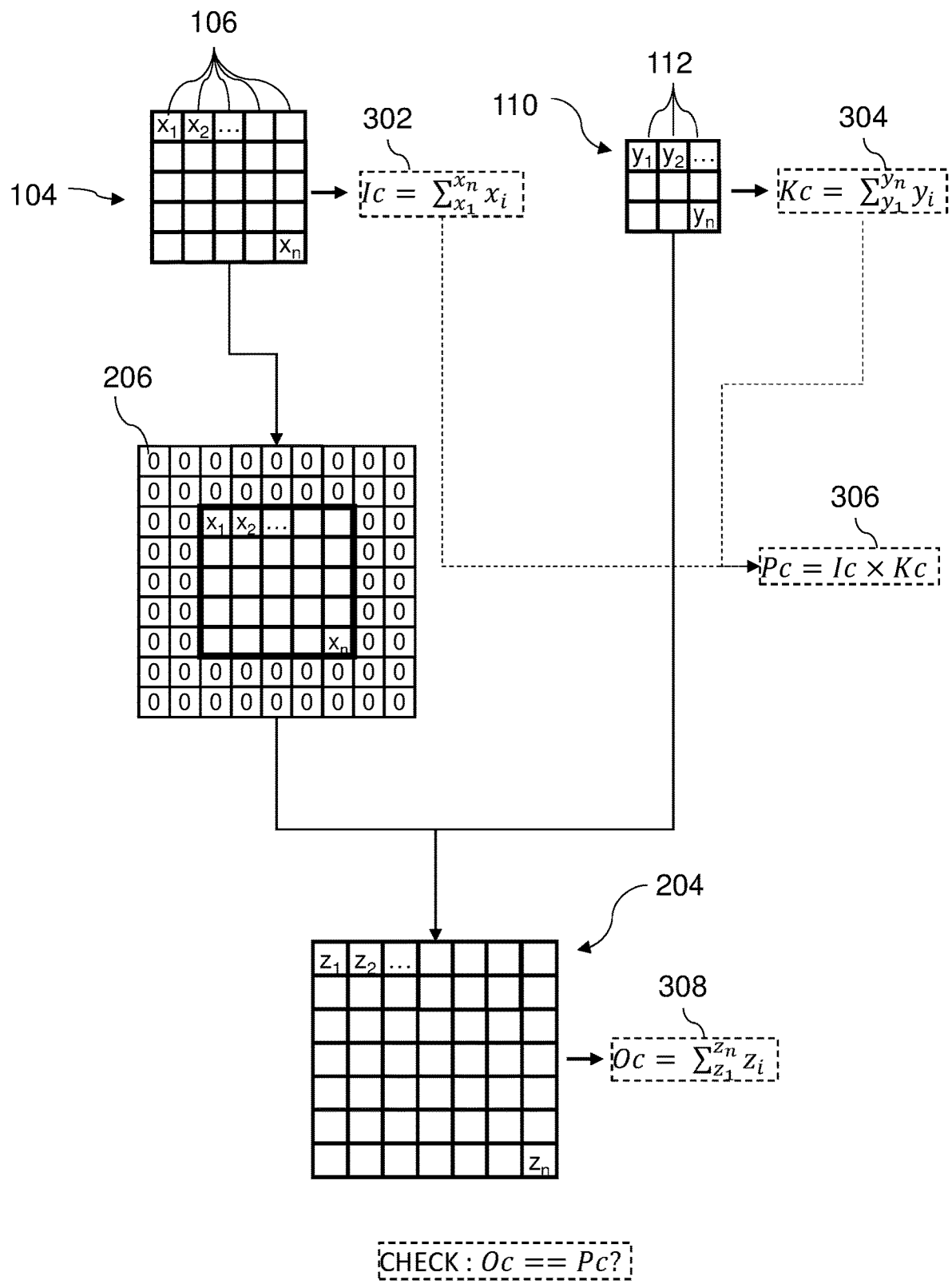
FIG. 3 is a schematic diagram showing an error detection operation that uses checksums according to examples.

Using full padding 206 on the edges of the input feature map 104 may also allow the use of certain checksum schemes to be performed when implementing a layer of the neural network, in other words when, or immediately after, generating the output feature map 204. FIG. 3 shows one such checksum scheme in which an input checksum 302 is determined for the input feature map 104 by summing all of the first set of values 106, and a kernel checksum 304 is determined for the kernel 110 by summing all of the second set of values 112. Padding 206 is added to the input feature map 104 which is then convolved with the kernel 110 to generate the output feature map 204. A predicted checksum 306 may be generated by multiplying the input checksum 302 with the kernel checksum 304. This predicted checksum 306 can then be compared to an output checksum 308 generated from a sum of all of the third set of values in the output feature map 204. If the predicted checksum 306 is not equal to the output checksum 308 then this may be an indication that there is an error present, for example, in one or more of the values of the input feature map 104 or the kernel 110, or having occurred during the convolution operation. Padding that is used for the output feature map to allow a checksum error detection scheme to be implemented may differ from SAME padding used to maintain the dimensionality of the output feature map 204. Padding used to allow a checksum scheme, as shown in FIG. 3, requires enough zeros to be added such that the kernel 112 can be convolved with the input feature map 104 at all available positions. On the contrary, SAME padding, in this example, would only require a single layer of zeros to be used on the edges of the input feature map 104. The amount of padding required to maintain the size of the output feature map 204 compared to the input feature map 104 is, in many cases, less than the amount of padding used for the checksum schemes shown in FIG. 3.

Figure 4:
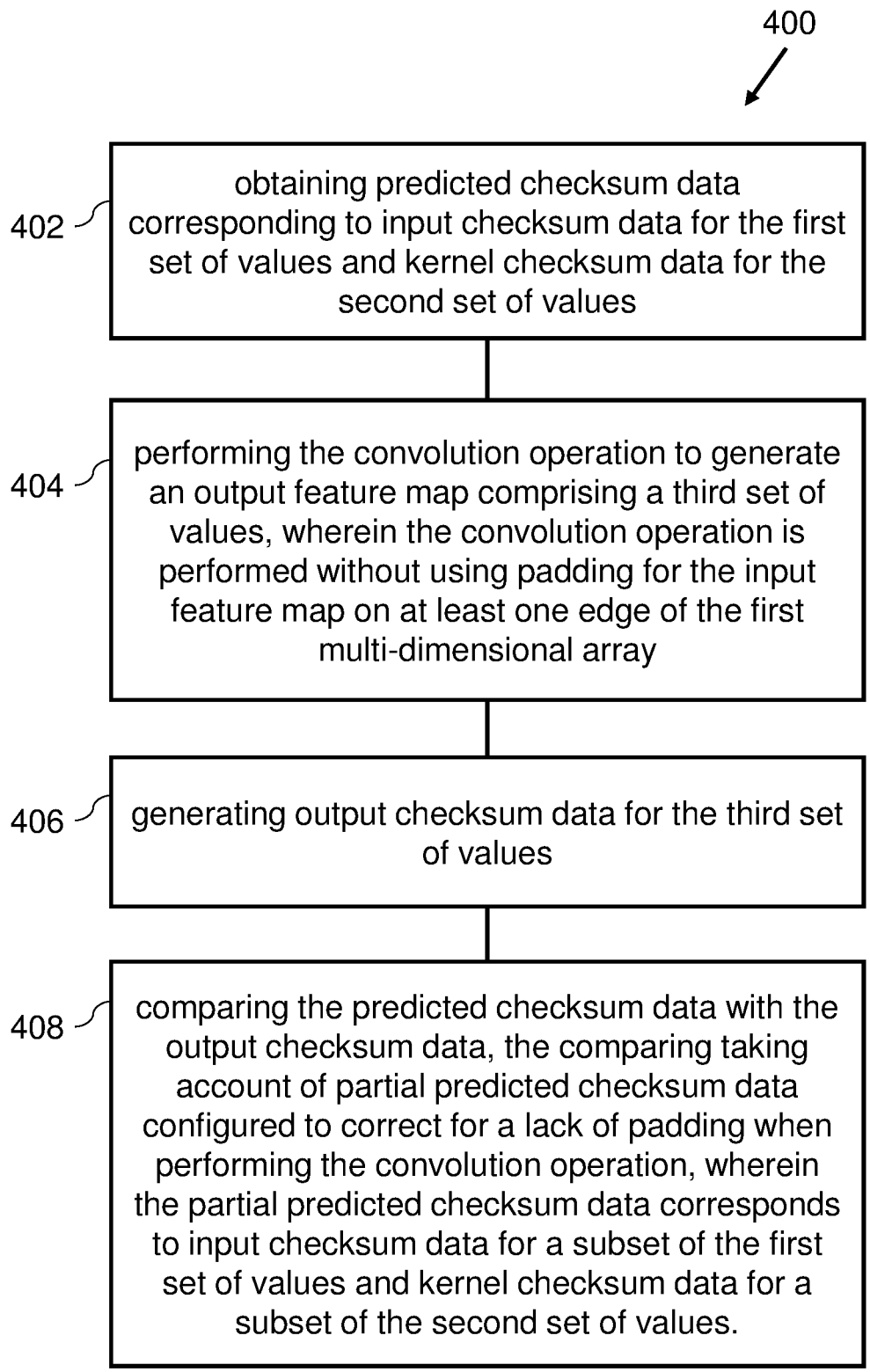
FIG. 4 is a flow chart showing a computer-implemented method according to examples.
Figure 5:
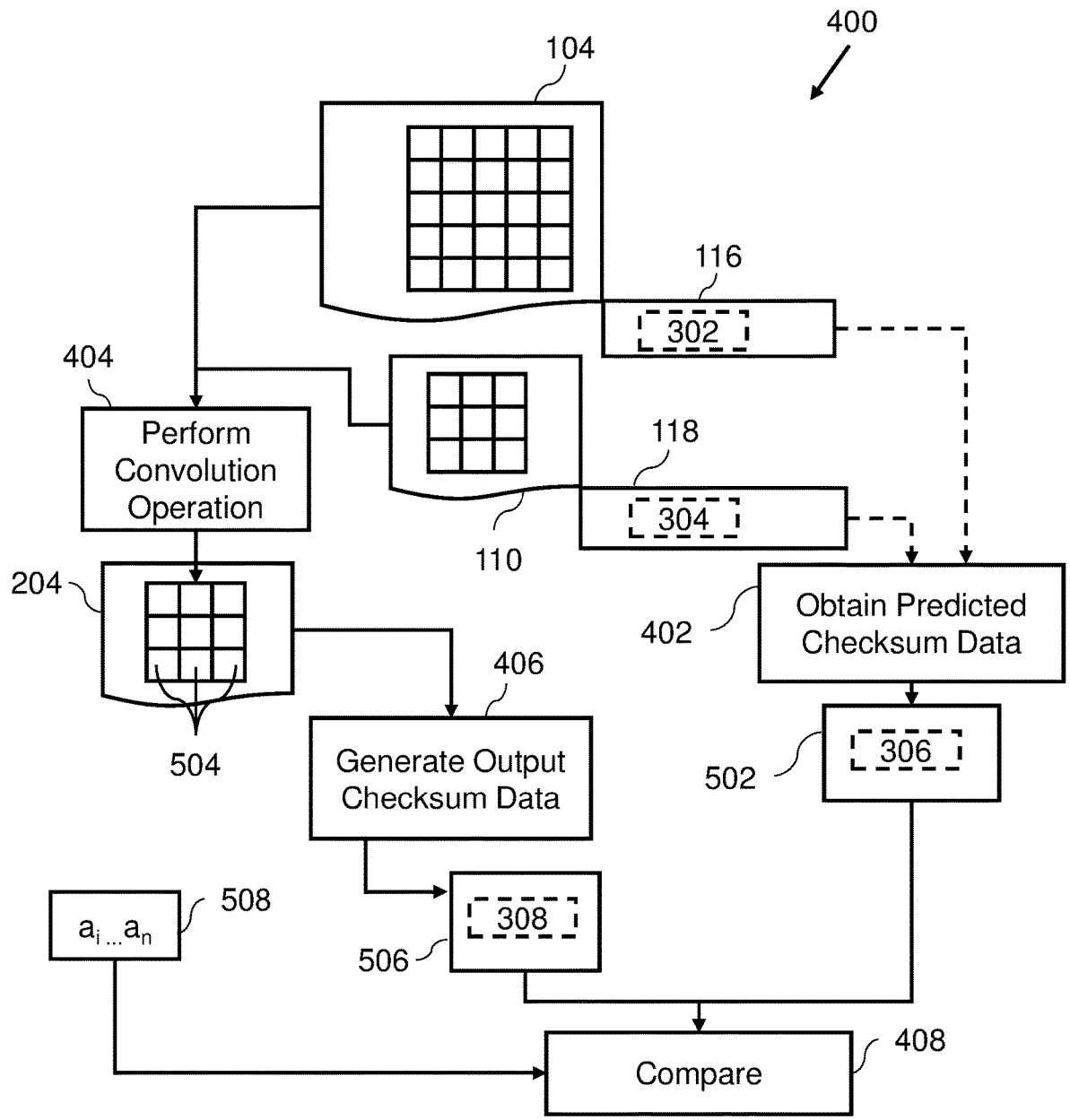
FIG. 5 is a schematic diagram showing the computer-implemented according to examples.

FIG. 4 and FIG. 5 show a computer-implemented method 400, as a flow chart and a schematic diagram respectively. The computer-implemented method 400 is suitable for detecting errors when performing a convolutional operation and may be performed by the data processing system 100. The computer-implemented method 200 performed by the data processing system 100 will now be described with reference to FIGS. 4 to 12C Errors, in the context of the computer-implemented method 400, generally relate to soft errors occurring due to data corruption. A soft error can occur when one or more elements of storage are broken, corrupted, or have been externally influenced for example by cosmic rays or other forms of radiation. Soft errors often manifest as a bit value being flipped from a 0 to a 1, or vice versa. These soft errors do not generally represent long term issues with hardware, and often, once a soft error occurs, can be corrected by reloading, or fetching, the affected data from a back-up such as another storage device 126. One such situation in which a soft error can occur is where a data processing system 100, such as an NPU, is configured to implement a convolutional neural network. In this case, data representing an input feature map 104 and/or a kernel 110 may be loaded to, and stored on, storage 120 in the data processing system 100. While stored on the storage 120, the data may be subject to corruption, for example, due to external influence, such as cosmic rays, or a transient hardware failure in the data processing system 100.

Checksum based error detection schemes, such as that described above in relation to FIG. 3, allow one to detect where a set of data does not match a checksum, generated from that data, at an earlier time. For example, a checksum may be generated and stored with the data at one time. At another time, after the checksum and data has been generated, a new checksum may be generated from the data and compared to the original checksum to determine if any of the data has changed. In some cases, checksums can be generated according to relatively simple algorithms, such as sums of data values. Alternatively, more complex algorithms may be used to generate checksums involving addition, multiplication and/or other mathematical operations.

The method 400 comprises obtaining 402 predicted checksum data 502 corresponding to input checksum data 116, for the first set of values 106, and kernel checksum data 118, for the second set of values 112. Obtaining the predicted checksum data 502 may comprise receiving the predicted checksum data 502 from an external source, such as the external storage 126. The predicted checksum sum data 502 can be generated along with the input checksum data 116, the kernel checksum data 118, and/or the respective input feature map 104 and the kernel 110, and provided to the data processing system 100 via the interface 124.

Alternatively, obtaining 402 the predicted checksum data 502 may comprise generating the predicted checksum data 502 from the input checksum data 116 and the kernel checksum data 118. As described above in relation to FIG. 1, the input feature map 104 and the kernel 110 may each be associated with respective checksum data, the input checksum data 116 and the kernel checksum data 116, which may be stored on the data processing system 100 and used to generate the predicted checksum data 502. In one specific example, the input checksum data 116 represents an input checksum 302 corresponding to a sum of all of the values 106 in the input feature map 104, and the kernel checksum data 118 represents a kernel checksum 304 corresponding to a sum of all of the values 112 in the kernel 110. In this specific example, generating the predicted checksum data 502 may include performing the process shown in FIG. 3 in which the input checksum 302 is multiplied with the kernel checksum 304 to determine a predicted checksum 306 which is then represented by the predicted checksum data 502.

The input checksum data 116 and/or the kernel checksum data 304 can be obtained by the data processing system 100 via the interface 124 or can be generated by the data processing system 100 from the first set of values 106 and the second set of values 112 respectively. The kernel 110 may be obtained by the data processing system via the interface 124 from the external storage 126. In some examples, the input feature map 104 is obtained from the external storage 126 via the interface 124. Alternatively, the input feature map 104 may be generated by the data processing system 100 as the output from a previous convolutional operation, for example, where the data processing system 100 implements a convolutional neural network, the input feature map 104 to be used for a current layer of the neural network, or convolutional operation, may be the output feature map of a previous layer of the neural network.

The method 400 includes performing 404 a convolution operation to generate an output feature map 204 comprising a third set of values 504. Output checksum data 506 is generated 406 for the third set of values 504, and the predicted checksum data 502 and the output checksum data 506 are compared 408. Comparing 408 the predicted checksum data 502 and the output checksum data 506 takes account of partial predicted checksum data 508 that is configured to correct for a lack of padding 206 when performing 404 the convolution operation. The partial predicted checksum data 508 corresponds to input checksum data for a subset of the first set of values 106 and kernel checksum data for a subset of the second set of values 112. Methods for generating the partial predicted checksum data 508 will be described further below with respect to FIG. 8.

The lack of padding may be where no padding is used on at least one edge of the first multi-dimensional array 108, or where there is a reduction in padding compared to full padding. The term "full padding" generally refers to k−1 padding, where k corresponds to a size of the kernel 110 and k−1 corresponds to a number of layers of padding added to the edges of the first multi-dimensional array 108. Full padding is used for checksum schemes such as that shown in FIG. 3. Full padding may result in an increase in the size of the output feature map 204 compared to the input feature map 104.

For example, in some cases the convolution may be performed with no padding 206 for the input feature map 104 on at least one edge of the first multi-dimensional array 108. In other cases, SAME padding may be used, such as where the SAME padding uses fewer zeros on the edges of the first multi-dimensional array than k−1 padding. In the examples shown in the Figures, where the input feature map is a 5×5 multi-dimensional array 108 and the kernel is a 3×3 multi-dimensional array, full padding includes using 2 layers of zeros on the edges of the first multi-dimensional array 108, and SAME padding includes using only 1 layer of zeros on the edges of the first multi-dimensional array 108.

Generally, when comparing checksum values, a determination of whether a given checksum value is the same as another checksum value is made. If the checksum values deviate from each other, then this is normally indicative of a difference between the underlying data from which the checksum values have been derived and can be indicative of an error. An analog to the current example is that generally, where full padding is used, the predicted checksum data 502 generated according to the scheme shown in FIG. 3 would represent a predicted checksum 306 that is equal to the output checksum 308 generated from the output feature map 204. A difference found in the comparing would normally be indicative of an error being present.

However, in the present example, there may be a lack of padding 206 such as using only SAME padding, or not using any padding 206 on at least one edge of the multi-dimensional array 108 and so the comparing takes account of the one or more partial predicted checksum data 508 to account for the lack of padding 206. This may be done by determining whether a difference between the predicted checksum 302, represented in the predicted checksum data 502, differs to an output checksum 308, represented in the output checksum data 506, by a magnitude that is equal to a magnitude of one or more of the partial predicted checksum values, $a_i \ldots a_n$, represented in the partial predicted checksum data 508. Alternatively, the predicted checksum data 502 and/or the output checksum data 506 may be modified using the partial predicted checksum data 508 to account for a difference which may have been introduced due to the lack of padding. The modified predicted checksum data 502 and output checksum data and 506 may then be compared to determine whether there is some deviation which is indicative of an error having occurred.

Comparing 408 the output checksum data 506 with the predicted checksum data 502 makes it possible to determine whether a soft error is present in any of the input feature map 104, the kernel 110, or has occurred when performing 404 the convolution operation. As described above in relation to FIG. 3, one such method for generating output checksum data 506, representative of an output checksum 306, for the third set of values 504 is to sum the third set of values 504 in the output feature map 204. However, as full padding 206 has not been provided along the length of at least one edge of the first multi-dimensional array 108 when performing the convolution, the number of values in the output feature map 204 will be reduced as compared to if full, k−1, padding 206 had been used around all of the edges of the first multi-dimensional array 108. As such, summing the third set of values 504 would provide an output checksum 308 which does not match the predicted checksum 306, generated by multiplying the input checksum 302 and the kernel checksum 304. This difference is addressed by the use of the partial predicted checksum data 508 that represents one or more partial predicted checksum values $a_i \ldots a_n$, which are configured to account, or correct, for the lack padding 204, and the resulting difference in the output checksum data 506.

As described above in relation to FIG. 2B and FIG. 3 padding is often used to maintain the spatial dimensions, or size, of the output feature map 204, i.e. to prevent the output feature map 204 from becoming smaller, or much smaller, than the input feature map 104, and also allows checksum schemes to be used which require only summing and comparing all available values. However, there are some cases where using full, k−1, padding 206 is undesirable, or infeasible, as it can cause significant computational inefficiencies.

For example, where the input feature map 104 is a high-resolution image comprising a set of pixel values arranged in a 1920×1080 two-dimensional array, adding two layers of padding to account for a 3×3 kernel convolved with stride 1 (i.e. making the input feature map an 1924×1084 image) represents a ~0.6% increase in the total number of values which are to be processed, however, where the input feature map 104 comprises a 10×10 two-dimensional array of values, then adding two layers of padding to account for a 3×3 kernel with stride 1, represents a 96% increase in the total number of values in the input feature map 104.

It is not uncommon for the spatial dimensions of a data set to be greatly reduced within the hidden layers of a neural network and there are often layers within neural networks in which padding is not used. It is desirable to be able to perform error detection when implementing these hidden layers without unduly increasing the computational resources used to implement these layers. As such, taking account of the one or more partial predicted checksum values, $a_i \ldots a_n$, in the partial predicted checksum data 508, representative of, or configured to correct for, a lack of padding 206, when comparing the output checksum data 506 with the predicted checksum data 502 allows for error detection to be performed without requiring that padding 206, or full padding 206, be provided around all, or in some cases any, edges of the multi-dimensional array 108 of the input feature map 104. It has been found that determining and applying the partial predicted checksum data 508 is significantly less computationally expensive than performing the additional multiply and accumulate operations which would be performed where full padding is provided on the edges of the input feature map 104.

Reducing the computational expense of performing error detection, for example by performing the convolutional operation without using padding on all edges of an input feature map, or without using k−1 padding on all edges, allows for error detection to be performed more frequently. For example, on a per layer basis, while mitigating an increase in computational resources which may otherwise occur when adding padding around the edges of the input feature map 104. This is particularly desirable in certain applications such as safety critical applications. Safety critical applications generally relate to applications of convolutional neural networks in which the correct output of the neural network is needed to ensure safe operation of an associated device or machine. Self-driving vehicles are one such example of a safety critical implementation of neural networks. Convolutional neural networks are often implemented in self-driving vehicles to process image, and other sensor, data to identify the surroundings of the vehicle, and to detect hazards, obstacles, and relative motion of objects in the surroundings of the vehicle. In these applications, the self-driving vehicles can use many thousands of outputs, from neural networks, every second to make decisions regarding speed, movement, braking and so forth. To ensure the safe operation of self-driving vehicles it is important that errors are detected as early as possible so that they are not propagated to other functions performed by the self-driving car. Self-driving cars are also provided with limited on-board computing resources which cannot be easily scaled up or scaled out. Making efficient use of the on-board computing resources whilst also being able to provide frequent error detection is desirable.

Enabling error detection to be performed more frequently, for example, on a per layer basis, while mitigating an increase in computational resources which may otherwise occur when adding padding around the edges of the input feature map 104, is also desirable in applications in which there is some restriction on the amount of computing resources which are available. For example, in handheld or mobile devices which have limited computing resources that cannot be easily scaled up or scaled out, trade-offs are generally made in error detection so that computational resources can be provided for performing other functions in the handheld or mobile device. By reducing the computational expense of performing error detection in each layer of a neural network, more error detection can be performed without substantially increasing the computational resources used to implement a neural network.

Figure 6:
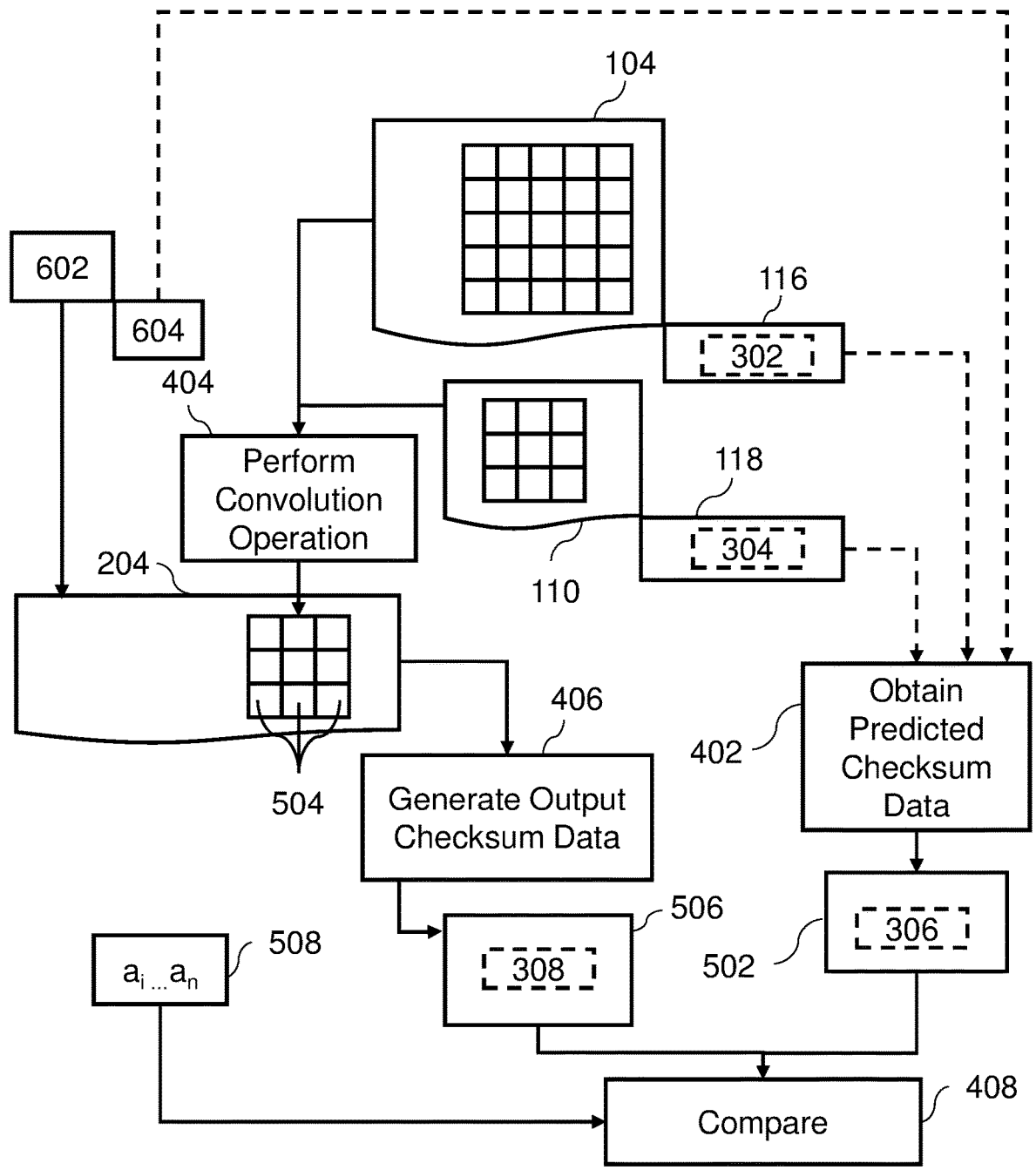
FIG. 6 is a schematic diagram showing a computer-implemented method according to examples in which an output feature map is modified using one or more bias values.

In some examples, a bias may be used to modify the output feature map 204, either during or immediately following the convolutional operation between the input feature map 104 and the kernel 110. FIG. 6 shows an example in which performing 404 the convolution operation comprises modifying the output feature map 204 according to one or more bias values 602. This may involve, for example, incrementing each of the third set of values 504 by an amount indicated by the one or more bias values 602. In some cases, there is one bias value used to modify each of the third set of values 504. Alternatively, a plurality of bias values may be used to modify the third set of values 504. Where the output feature map 204 is modified according to the one or more bias values 602, the predicted checksum data 402 may correspond to the input checksum data 116, the kernel checksum data 118, and bias checksum data 604 for the one or more bias values. The bias checksum data 604 may be obtained from external storage 126 to be used to generate the predicted checksum data 502. Alternatively, the bias checksum data 604 may be generated by the data processing system 100 from the one or more bias values 602.

The bias checksum data 604 may be dependent on the one or more bias values 602 and a size of the output feature map 204. Where modifying the output feature map 204 comprises incrementing each of the third set of values 504 by a bias value, the bias checksum data 604 may be generated by multiplying the number of values in the third set of values 504 by the bias value to determine a bias checksum. Referring again to FIG. 3, the predicted checksum 306 may be generated by multiplying the input checksum 302 with a kernel checksum 304. Where a bias is introduced by incrementing each of the third set of values by a bias value, the predicted checksum 306 may be generated by multiplying the input checksum 302 with the kernel checksum 304 and subsequently adding the bias checksum.

In some examples, no padding 206 may be provided along, or on, any edge of the first multi-dimensional array 108 when performing 404 the convolution operation. In this case, a plurality of partial predicted checksum values $a_i \ldots a_n$ may be taken into account when comparing 408 the predicted checksum data 502 with the output checksum data 506. For example, a respective partial predicted checksum value may be used to account for the lack of padding for each of the edges of the first multi-dimensional array 108. Alternatively, a first partial predicted checksum value may be used to account for the lack of padding for two opposing edges of the first multi-dimensional array 108, and a second partial predicted checksum value may be used to account for the lack of padding for the two other opposing edges of the first multi-dimensional array 108.

Figure 7:
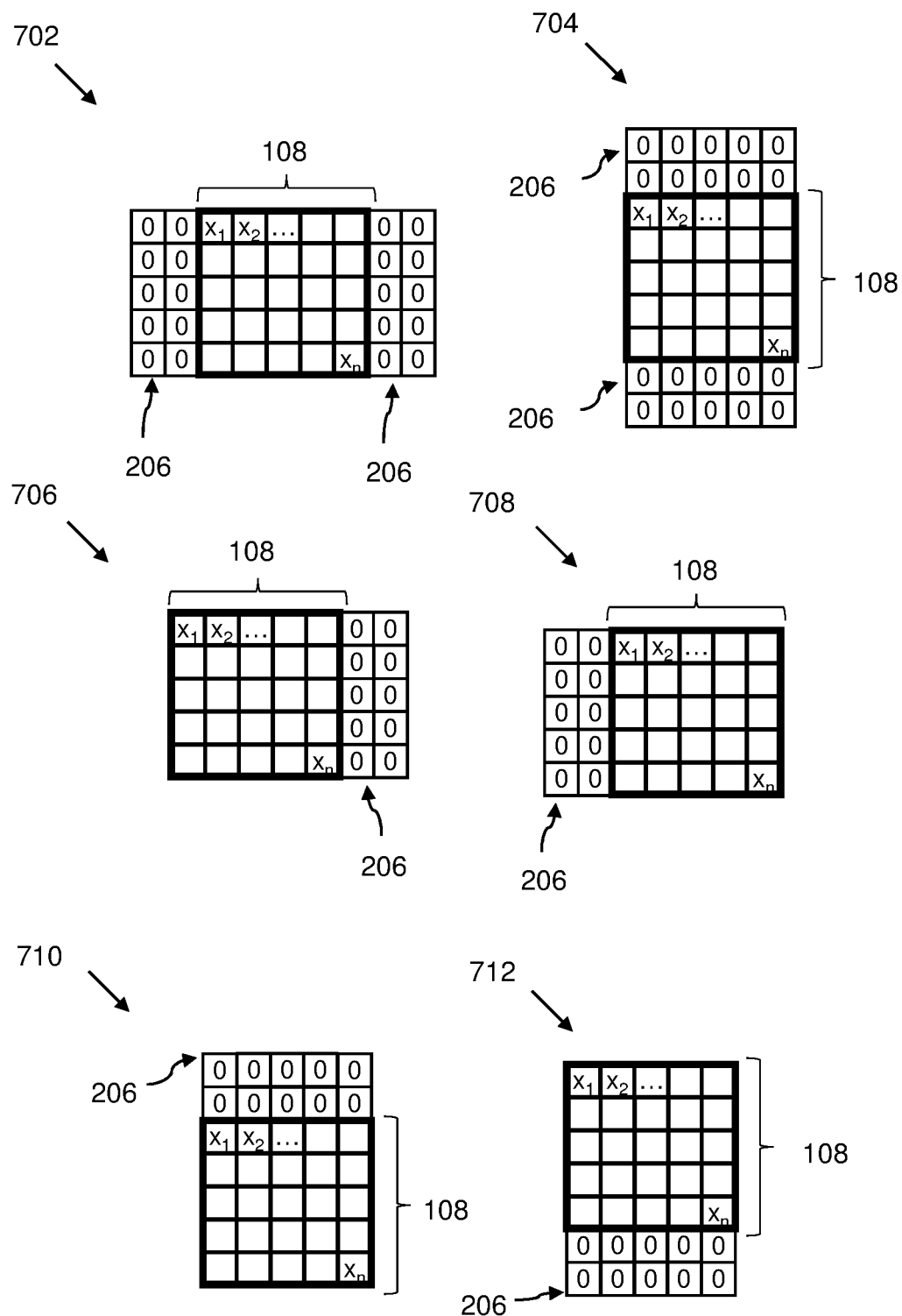
FIG. 7 is a schematic diagram showing potential arrangements of padding which may be used when performing a convolution operation according to examples.

FIG. 7 shows examples of different arrangements of padding 206 which may be used when performing 404 the convolution. A first arrangement 702 involves the use of padding 206 on two opposing edges of the first multi-dimensional array 108. The second arrangement 704 shows the use of padding 206 on two opposing edges of the first multi-dimensional array which are different to the opposing edges on which the padding is provided in the first arrangement 702. The remaining arrangements 706 to 712 include providing padding 206 on respective, different, edges of the first multi-dimensional array 108. In other examples, not shown, the padding 206 may be provided on three edges of the input feature map 104. Padding is typically added symmetrically around the edges of an input feature map 104, however, adding padding to one side of an input feature map 104 and not adding padding to an opposing side, as shown in arrangements 706 to 708, is also possible.

Figure 8:
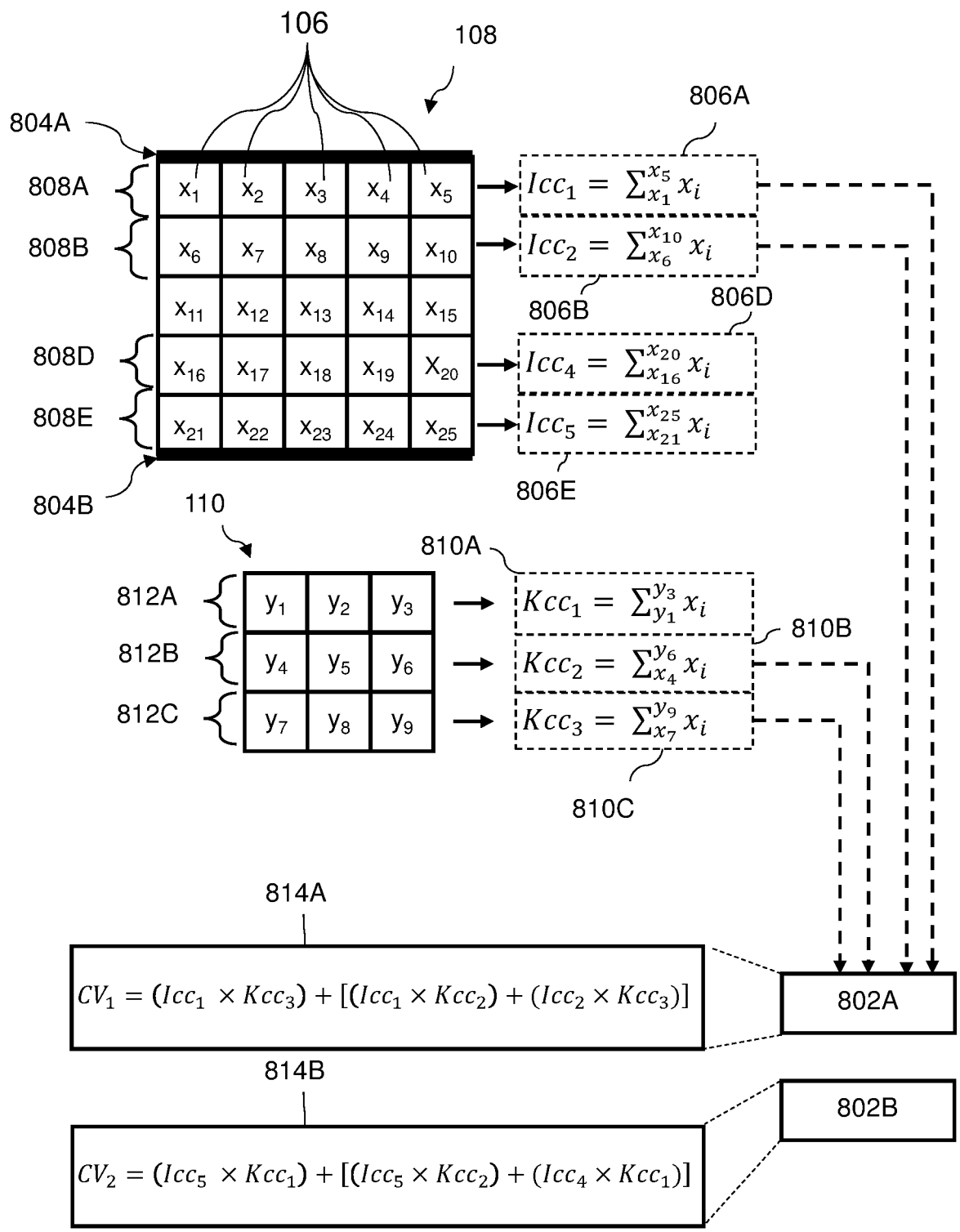
FIG. 8 is a schematic diagram showing methods of generating one or more partial predicted checksum values according to examples.

FIG. 8 shows an example of generating a partial predicted checksum value 802A to be represented in the partial predicted checksum data 508 which is adapted to account for the lack of padding used on a first edge 804A of the first multi-dimensional array 108. Generating the partial predicted checksum value 802A in the present example comprises determining one or more input correction checksums 806A based on a first linear array of values 808A from the first set of values 106 in the first multi-dimensional array 108. The first linear array of values 808A has a linear arrangement adjacent to the first edge 804A. That is to say that the first linear array 808A is an array in which each of the values in the array is adjacent to the first edge 804A. One or more kernel correction checksums 810C are also determined, based on a second linear array of values 812C from the second set of values 112 of the kernel 110. The second linear array 812C corresponds in arrangement to the arrangement of the first linear array 808A. That is to say that the second linear array 812C comprises values which are arranged along an edge of the second multi-dimensional array 114 of the kernel 110 that is parallel to the edge 804A for which the lack of padding is being taken into account. In some cases it may be considered that both the first linear arrangement 808A and the second linear arrangement 812C form respective rows of values, or in other cases respective columns of values.

The partial predicted checksum value 802A may be generated by processing the one or more input correction checksums 806A with the one or more kernel correction checksums 810C to account for the lack of padding on the said edge 804A. As can be seen in the example of FIG. 8, the second linear array 812C, comprising values from the kernel 110, is a set of values which form a linear array that is parallel to, and on an opposing side of, the kernel 110 as compared to the first linear array 808A and its corresponding arrangement in the first multi-dimensional array 108. That is to say that the values in the second linear array 812C comprise a subset of the second set of values 112 that would be overlaid, or aligned, with the values in the first linear array 808A if padding was used on the first edge 804A when performing the convolution.

In the present example, shown in FIG. 8, generating partial predicted checksum value 802A includes determining two input correction checksums 806A and 806B, based on a subset of the first set of values 106, which in this case includes the first linear array 808A and a third linear array 808B respectively. The third linear array 808B is parallel and adjacent to the first linear array 808A. In the example of FIG. 8 two kernel correction checksums 810C and 810B are generated, based on the second linear array 812C and a fourth linear array of values 812B respectively. The fourth linear array 812B is parallel and adjacent to the second linear array 812C. Both the two input correction checksums 806A and 806B and the two kernel correction checksums 810C and 810B are used to generate the partial predicted checksum value 802A.

An example of an expression 814A for calculating the partial predicted checksum value 802A in the present case is shown in FIG. 8 and expressed below in (1):

$$CV_1 = (Icc_1 \times Kcc_3) + [(Icc_1 \times Kcc_2) + (Icc_2 \times Kcc_3)]$$ Equation. (1)

Wherein $CV_1$ represents the partial predicted checksum value 802A, $Icc_1$ represents the first input correction checksum 806A, $Icc_2$ represents the second input correction checksum 806B, $Kcc_3$ represents the first kernel correction checksum 810C, and $Kcc_2$ represents the second kernel correction checksum 810B.

The number of input correction checksums 806A, 806B, and kernel correction checksums 810C, 810B which are used to generate the partial predicted checksum value 802A is dependent on the size of the stride, the size of the kernel 110, or a size of the multi-dimensional array 114 in the kernel 110, and hence the amount of padding which would be used on the first edge 804A. In the example shown in FIG. 8 the kernel 110 comprises a two-dimensional 3×3 array of values and the stride is 1, hence the padding which would be used on the first edge 804A of the first multi-dimensional array would include two layers, or two rows, of 0 values. The first term, $(Icc_1 \times Kcc_3)$, of equation 1, determines a value which accounts for a first set of positions of the kernel in relation to the input feature map when performing the convolution, if padding was used on the first edge 804A, in which the first linear array 808A would overlap, or align, with the second linear array 812C. The second term, $[(Icc_1 \times Kcc_2) + (Icc_2 \times Kcc_3)]$, of equation 1, determines a value which accounts for a second set of positions of the kernel 110 in relation to the input feature map 104 when performing the convolution if padding 206 was used on the first edge 804A, in which the first linear array 808A would overlap, or align, with the fourth linear array 812B, and the third linear array 808B would overlap, or align, with the second linear array 812C.

It will be appreciated by a person skilled in the art that, where a 2×2 kernel is used, only one input correction checksum 806A and kernel correction checksum 810C may be used to generate the partial predicted checksum value 802A. It will also be appreciated by the skilled person that a number of different kernel sizes may be used with this method 400 by making suitable modifications to the specific calculations shown in the Figures. For example, 3×3, 4×4, 5×5, 10×10 kernels and so forth may all be used with this method.

A similar expression 814B to that shown in FIG. 8 for the first partial predicted checksum value 802A, and expressed above in equation (1), can also be used to calculate a second partial predicted checksum value 802B to account for the lack of padding on a second edge 804B of the first multi-dimensional array 108. Calculating the second partial predicted checksum value 802B in the example shown uses corresponding and opposite input correction checksums 806D, 806E and kernel correction checksums 810A, 810B, from respective linear arrays 808D, 808E, and 812A, 812B. The first partial predicted checksum value 802A and second partial predicted checksum value 802B may also be combined into a single partial predicted checksum value adapted to account for the lack of padding on both the first edge 804A and the second edge 804B of the first multi-dimensional array 108.

It will also be appreciated that a similar operation can be performed to account for a lack of padding on other edges of the first multi-dimensional array that are perpendicular to the first 804A and second 804B edges shown in FIG. 8 by transposing the calculation of the input correction checksums and kernel correction checksums to use linear arrays that are perpendicular to those shown in FIG. 8.

Determining partial predicted checksum data 508 may also enable the sub output feature map error detection to be performed. In particular, where partial predicted checksum data 508 is generated, a set of partial predicted checksum values representative of a prediction of a subset of the third set of values 504 may be stored, for example the input correction checksums 806A to 806E may be processed with corresponding kernel correction checksums 810A to 810C to obtain a partial predicted checksum value for each row in the output feature map. Similar processes may be performed in a transposed arrangement to obtain predicted checksum values for each column in the output feature map. In this case, the row-wise or column-wise partial predicted checksum values may be compared with respective row-wise or column-wise partial output checksum values to determine a specific row and/or column in which an error is detected.

By combining row and column partial predicted checksum value comparisons with respective row and column partial output checksums to determine a precise location of the errors. In this way, the accuracy of the error detection may be increased though this may come at the computational expense of storing extra values in the partial predicted checksum data 508. However, in combination with compression schemes described below, the storage overheads may be outweighed by the increase in the accuracy of the error detection. In some cases, the method 400 may allow for the selection of a more accurate error detection mode (e.g. using these row and/or column wise partial predicted checksum comparisons), or a less accurate but more computationally efficient error detection scheme.

Figure 9:
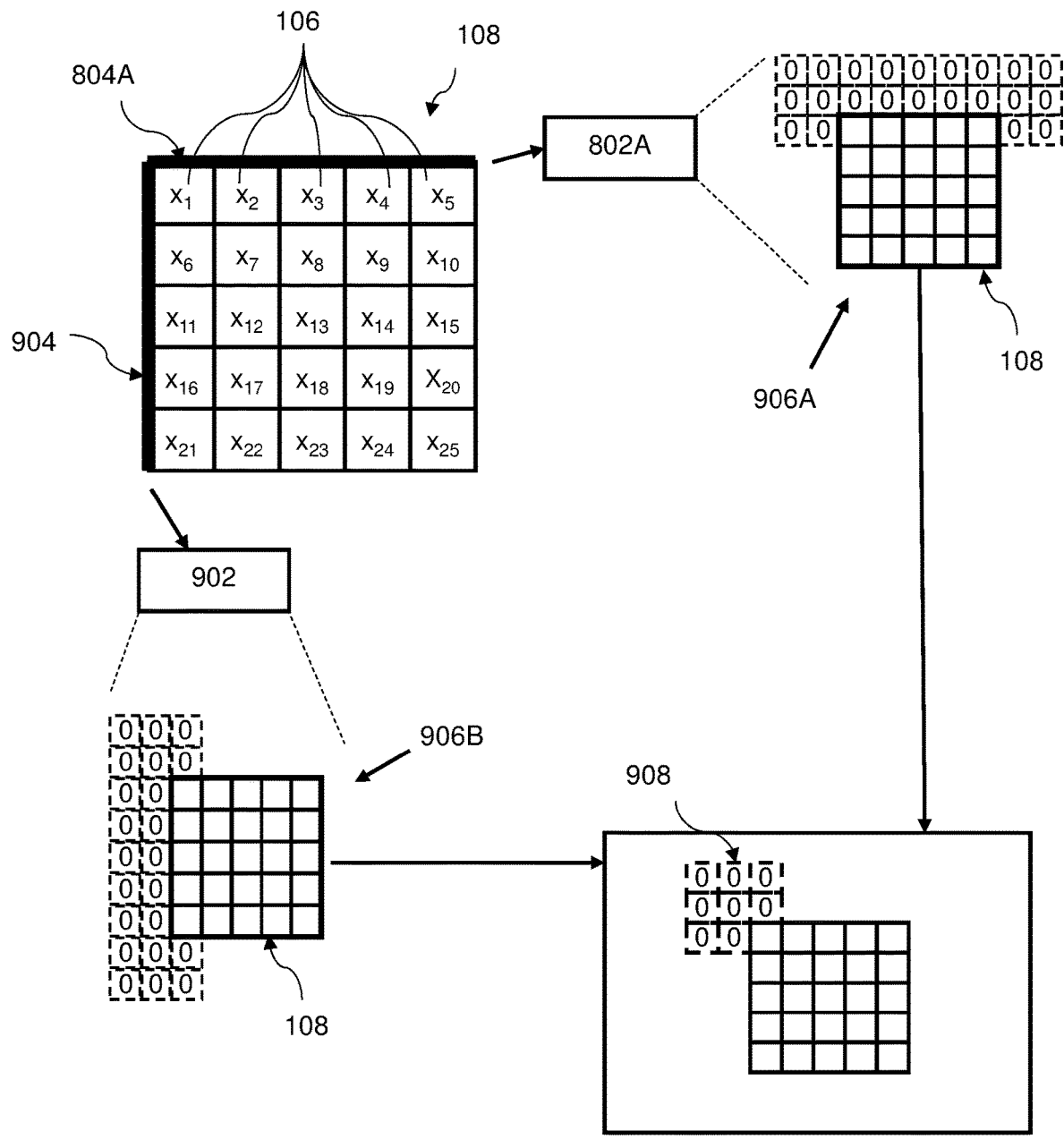
FIG. 9 is a schematic diagram showing overcorrection being applied when generating multiple partial predicted checksum values s according to a given example method.

In examples where the process described above with respect to FIG. 8 is used to generate a partial predicted checksum value 802A to account for a lack of padding for a given edge 804A, and is also used to generate a further partial predicted checksum value to account for a lack of padding on a further, perpendicular, edge of the first multi-dimensional array 108 an error may be introduced due to an overcorrection of the lack of padding. FIG. 9 illustrates the overcorrection which may be caused and how the method 400 may address this overcorrection. In the example shown in FIG. 9, the process of generating a partial predicted checksum value 802A as described with respect to FIG. 8 has been performed to generate a given partial predicted checksum value 802A representative of a lack of padding on a given edge 804A of the first multi-dimensional array and also performed to generate a further partial predicted checksum value 902 representative of a lack of padding on a further edge 904 that is perpendicular to the given edge 804A. Representations 906A and 906B of the lack of padding which is represented by the respective partial predicted checksum value s, 802A and 902, is shown. From this it can be seen that there is an overlapping region of padding 908 which is represented by both the given partial predicted checksum value 802A and the further partial predicted checksum value 902 and hence may lead to an overcorrection at a corner of the input feature map 104. The method 400 may further comprise generating an overcorrection value (not shown in FIG. 9) based on the first set of values 106 and the second set of values 112 and the comparing the predicted checksum data 502 with the output checksum data 506 may take account of the one or more partial predicted checksum value s 802A and 902 and also of the overcorrection value.

Figure 10:
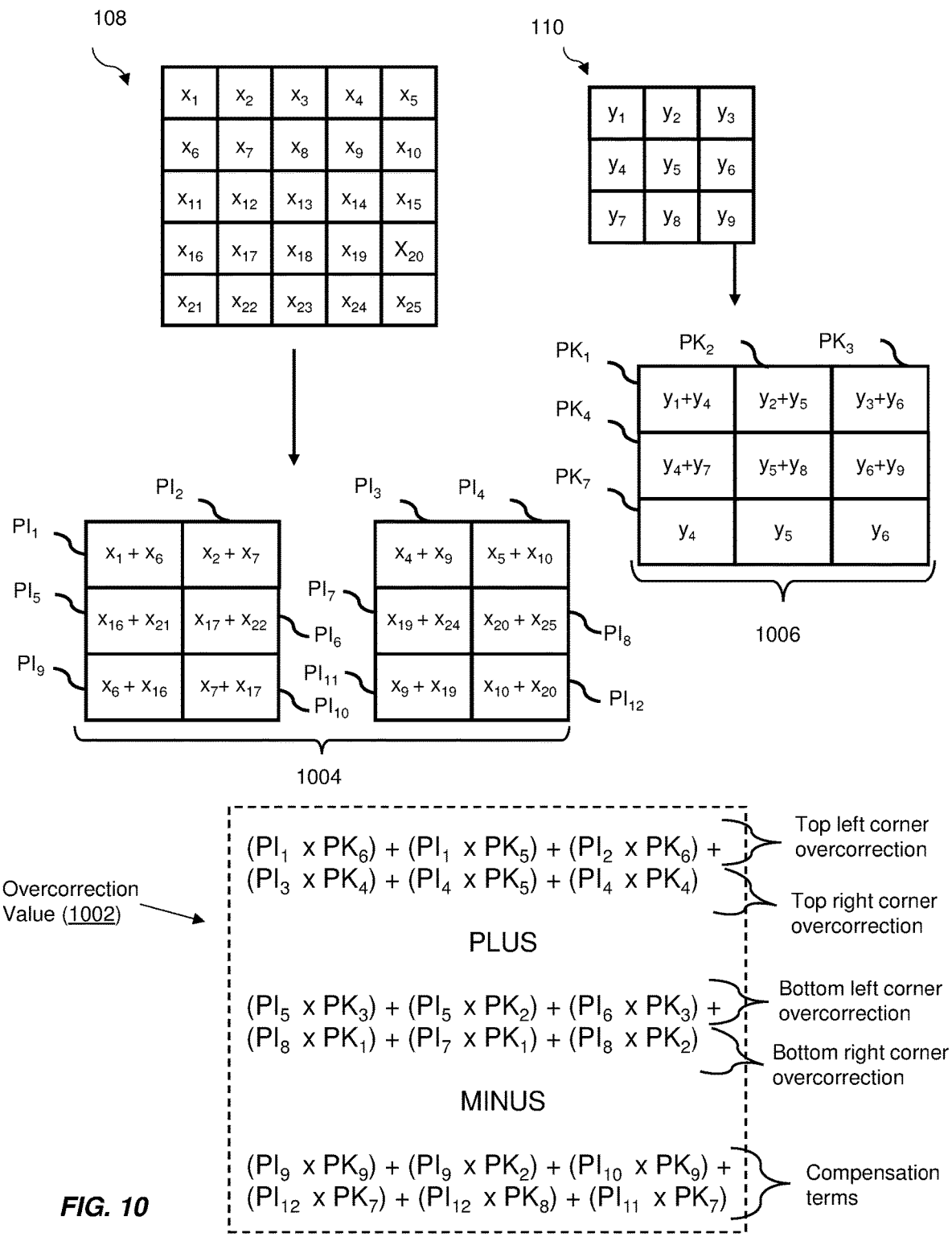
FIG. 10 is a schematic diagram showing methods of generating an overcorrection value according to examples.

The overcorrection value can be calculated in any of a number of different ways. FIG. 10 illustrates an example of how the overcorrection value can be determined. In the example shown in FIG. 10 an overcorrection value 1002 is generated from partial checksum values generated from the subsets of the first 106 and second sets of values 112. The specific expression shown in FIG. 10 is adapted to account for an overcorrection arising at all four corners of the first multi-dimensional array 108. That is to say that this expression may be used where partial predicted checksum data 508 configured to correct for a lack of padding on all edges of the first multi-dimensional array is used, generated according to the process described above in relation to FIG. 8 and FIG. 9.

The expression shown in FIG. 10 uses partial input checksums 1004 and partial kernel checksums 1006 that are calculated from the first set of values 106 and the second set of values respectively 112. The partial input checksums 1004 and partial kernel checksums 1006 may be processed to generate one or more overcorrection values 1002. The partial input checksums 1002 are each generated from a subset of the first set of values 106, and the partial kernel checksums 1004 are each generated from a subset of the second set of values 112. Not all partial kernel checksums 1006 are labelled in FIG. 10 for simplicity, although their respective positions and associated label will be identifiable from the labelling convention of the other partial kernel checksums 1006. The partial input checksums 1004 are each generated by summing values in a first linear array having an arrangement that is parallel to an edge of the input feature map, with values in a second linear array that corresponds in arrangement to the arrangement of the first linear array, wherein the values which are summed have corresponding positions in their respective linear array and represent the regions of overlap that would occur when the kernel is convolved with the input feature map in a respective corner. In the example shown, values for two linear arrays at a top side of the input feature map are summed, and values for two linear arrays at a bottom side of the input feature map are summed, due to the amount of padding used for a 3×3 kernel. However, it will be understood that more values may be included in the calculation of the partial input checksums where the kernel is larger, and therefore where the amount of padding that would be used is greater.

The partial input checksums 1004 also include partial checksum values relating to linear arrangements away from the edges of the input feature map 104. These are similarly determined from values in parallel linear arrangement and are selected to account for a further overcorrection which can occur from calculating the partial input checksums 10004 as described above and shown in FIG. 10.

It is to be appreciated that other expressions are also possible, and the overcorrection value 1002 may be the result of operations such as addition and subtraction performed using a plurality of overcorrection sub values. It will be appreciated by the skilled person that while the expression shown in FIG. 10 may be used to generate an overcorrection value which accounts for an overcorrection in all four corners of the first multi-dimensional array, modifications to this expression can be made to account for overcorrections in only a subset of these corners.

In other examples, not shown, the overcorrection value 1002 can be determined by performing convolutions between the kernel 110 and the input feature map 104 at specific respective alignments, or positions, of the kernel 110 and the input feature map 104 which are representative of an overcorrection introduced by the one or more corrections values 508.

The positions of the values in the input feature map 104 and the kernel 110 which are to be used to generate the partial checksums are generally known at the time at which the instructions for implementing the neural network are compiled. As such, the partial kernel checksums 1006 can be determined at the time of compile, and the partial input checksums 1004 can be determined at the time of compile where the input feature map 104 is known.

Figure 11:
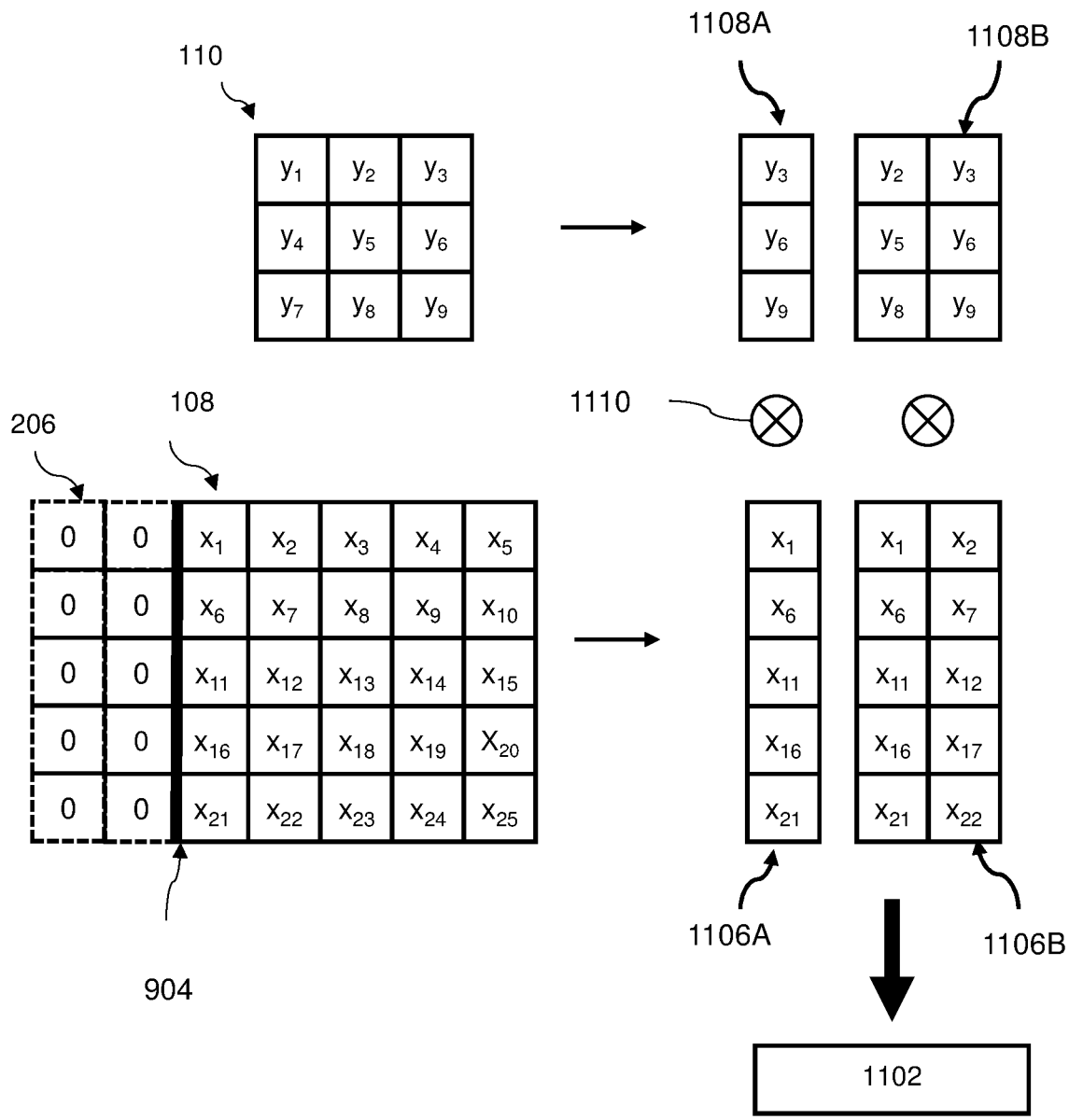
FIG. 11 is a schematic diagram showing method of generating one or more partial predicted checksum values according to examples.

FIG. 11 shows an alternative process for generating the one or more partial predicted checksum values compared to the process described above in relation to FIG. 8 and FIG. 9. In the example shown in FIG. 11a partial predicted checksum value 1102 configured to correct for a lack of padding 206 on an edge 904 of the first multi-dimensional array 108 may be generated by identifying a first linear array of values 1106A from the first set of values 106, the first linear array 1106A having an arrangement adjacent to the edge 904 of the first multi-dimensional array 108. A second linear array of values 1108A from the second set of values 112 is identified, the second linear array 1108A corresponding in arrangement to the arrangement of the first linear array 1106A. The first linear array of values 1106A is then convolved 1110 with the second linear array of values 1108A to produce the said partial predicted checksum value 1102. As mentioned above with respect to the example of FIG. 8 the kernel 110 shown throughout the present disclosure comprises a 3×3 array and hence there are two sets of overlapping positions which are excluded from the convolution operation, that has been originally performed to generate the output feature map 204 when padding is not used on the edge 904. Hence, in the present example a third linear array 1106B and a fourth linear array 1108B are also identified from the first set of values 108 and the second set of values respectively 112. The third and fourth 1106B and 1108B linear arrays having an arrangement which is adjacent and parallel to the first 1106A and 1108A linear arrays respectively. A convolution 1110 is then performed between linear arrays for the first set of values and corresponding linear arrays for the second set of values to generate the partial predicted checksum value 1102 which is representative of a lack of padding having been used on the edge 904 when performing 404 the convolution operation.

In the examples described above with respect to FIGS. 7 to 11 the partial predicted checksum value calculations that have been shown are used to account for no padding 206 being used on at least one edge of the first multi-dimensional array 108. However, it will be appreciated that where there is a lack of padding used for the first multi-dimensional array 108 some SAME padding may still be used for the input feature map 104. The calculations used to obtain the partial predicted checksum data 508 may be suitably modified to account for some SAME padding, but not full padding.

Figure 12A:
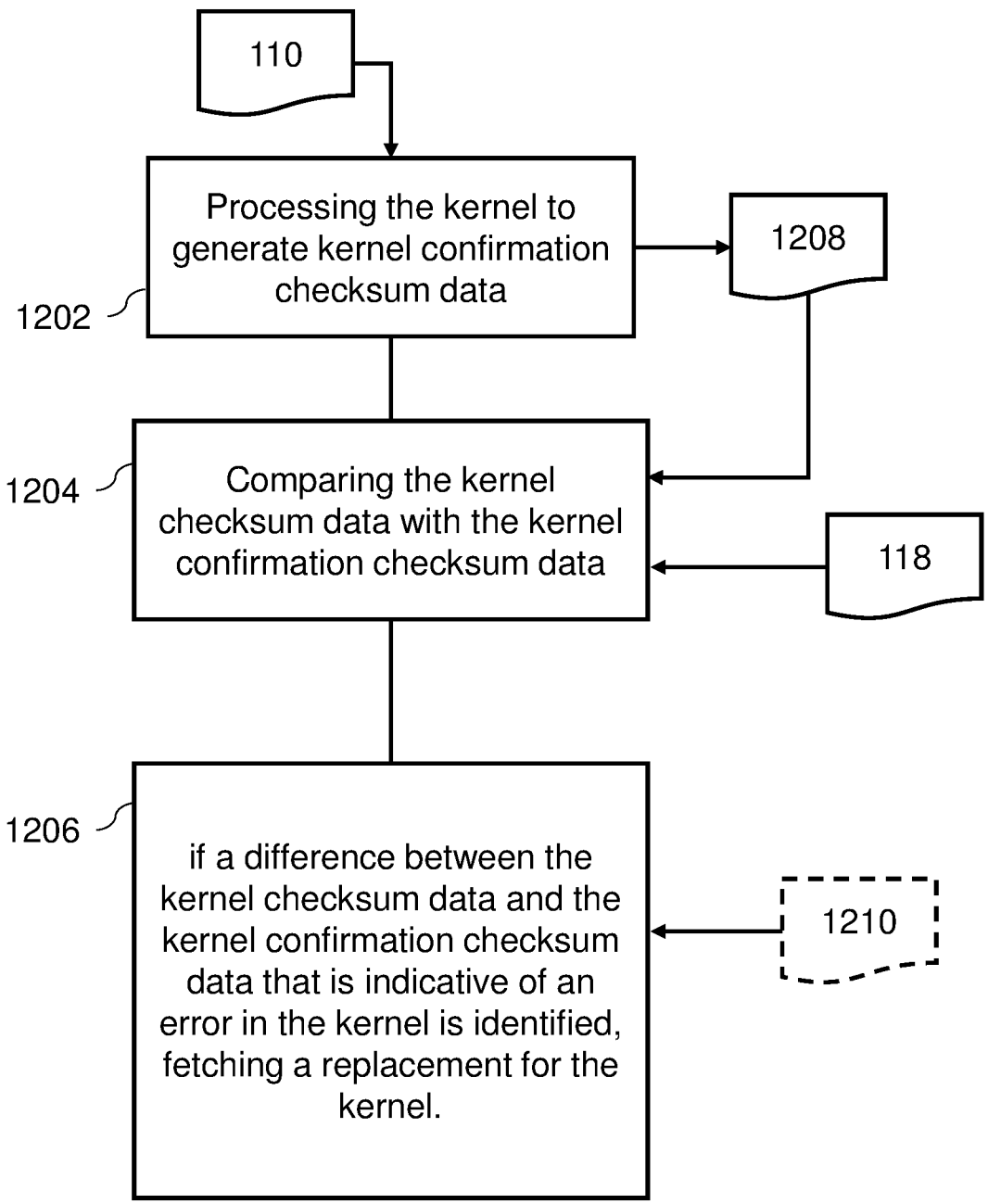
FIG. 12A is schematic diagram showing method steps performed by a data processing system following the identification of an error according to examples.
Figure 12B:
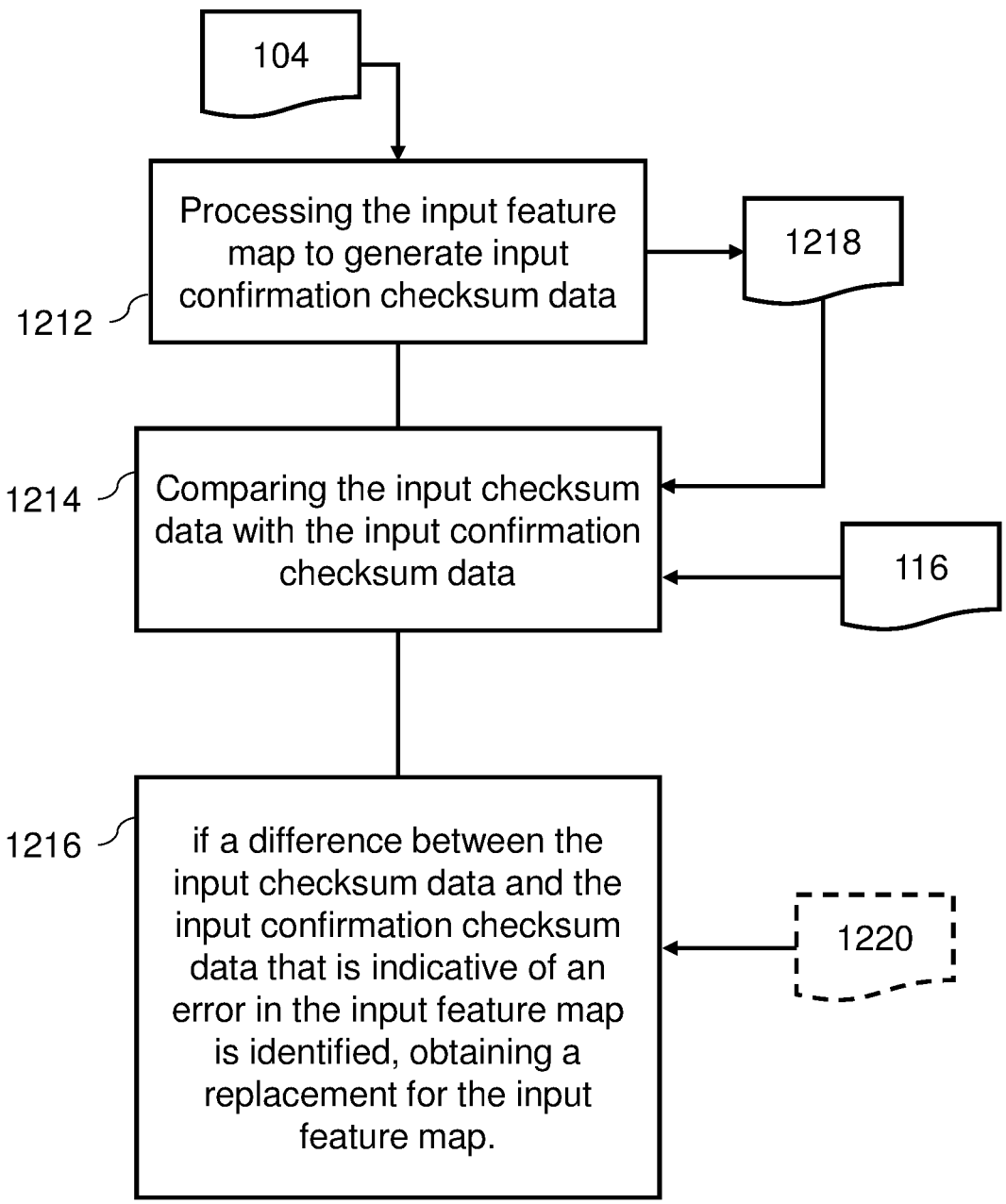
FIG. 12B is a schematic diagram showing method steps performed by a data processing system following the identification of an error according to examples.

In some examples, the data processing system 100 may perform steps, following the detection of an error, to determine a likely source of the error. FIGS. 12A, 12B, and, 12C show examples of further steps the data processing system 100 may implement if a difference between the predicted checksum data 502 and the output checksum data 506, that is indicative of an error, is identified when comparing 408 the predicted checksum data 502 with the output checksum data 506.

In the example shown in FIG. 12A the method 400 may further comprise, if a difference indicative of an error is identified when comparing the predicted checksum data 502 and the output checksum data 506, processing 1202 the kernel 110 to generate kernel confirmation checksum data 1208. The kernel confirmation checksum data 1208 may be representative of a recalculation of the kernel checksum 304. The kernel checksum data 118 may be compared 1204 with the kernel confirmation checksum data 1208. If a difference between the kernel checksum data 118 and the kernel confirmation checksum data 1208, indicative of an error in the kernel, is identified, the method 400 may comprise fetching 1206 a replacement 1210 for the kernel. Fetching the replacement 1210 for the kernel may comprise obtaining the replacement 1210 from the external storage 126 via the interface 124. The replacement 1210 may be a copy of an original kernel which was intended to be used in the convolution operation.

In the example shown in FIG. 12B the method 400 may further comprise, if a difference indicative of an error is identified when comparing the predicted checksum data 502 and the output checksum data 506, processing 1212 the input feature map 104 to generate input confirmation checksum data 1218. The input confirmation checksum data 1218 may be representative of a recalculation of the input checksum 302. The input checksum data 116 may be compared 1214 with the input confirmation checksum data 1218. If a difference between the input checksum data 116 and the input confirmation checksum data 1218, indicative of an error in the input feature map 104, is identified, the method 400 may comprise obtaining 1216 a replacement 1220 for the input feature map 104. Obtaining the replacement 1220 for the input feature map may comprise obtaining the replacement 1220 from the external storage 126 via the interface 124. The replacement 1210 may be a copy of an original input feature map which was intended to be used in the convolution operation. Alternatively, obtaining the replacement 1220 may comprise performing a convolution operation. For example, where the input feature map 104 was obtained as an output from a previous convolution operation, obtaining the replacement 1220 may involve re-performing that convolution operation that produced the input feature map 104.

Figure 12C:
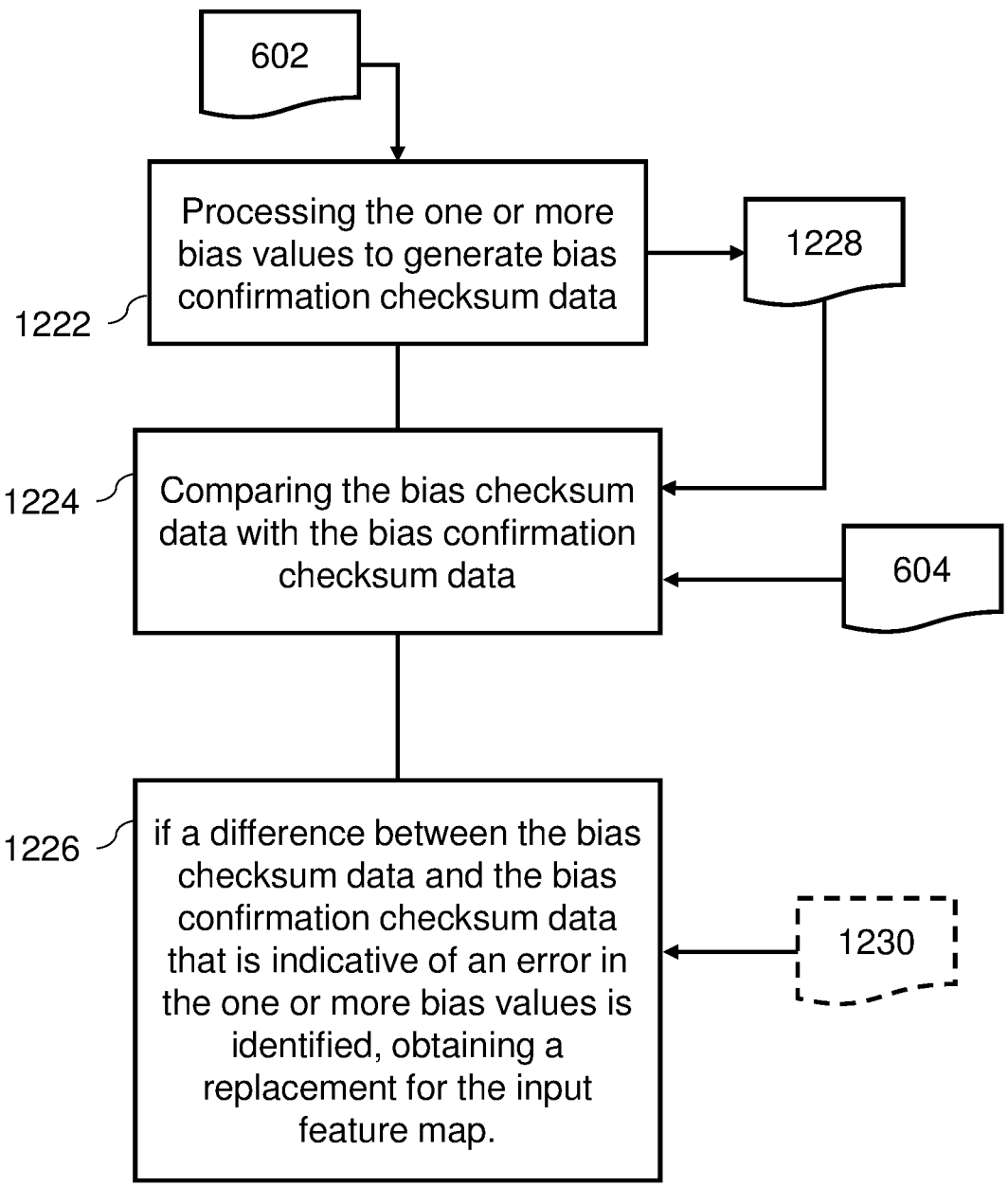
FIG. 12C is schematic diagram showing method steps performed by a data processing system following the identification of an error according to examples.

The example shown in FIG. 12C is applicable to implementations in which one or more bias values 602 are used to modify the output feature map 204 as described above with respect to FIG. 6. In the example of FIG. 12C the method may further comprise, if a difference indicative of an error is identified when comparing the predicted checksum data 502 and the output checksum data 506, processing 1222 the one or more bias values 602 to generate bias confirmation checksum data 1228. The bias confirmation checksum data 1228 may be representative of a recalculation of a checksum for the one or more bias values 602. The bias checksum data 604 may be compared 1224 with the bias confirmation checksum data 1228. If a difference between the bias checksum data 604 and the bias confirmation checksum data 1228, indicative of an error in the one or more bias values, is identified, the method 400 may comprise fetching 1226 a replacement 1230 for the one or more bias values 602. Fetching the replacement 1230 for the one or more bias values 602 may comprise obtaining the replacement 1230 from the external storage 126 via the interface 124. The replacement 1230 may be a copy of an original set of one or more bias values which was intended to be used in the convolution operation to modify the output feature map 204.

The examples described above with respect to FIGS. 12A, 12B, and, 12C allow for the data processing system 100 to narrow down where an error has occurred during an operation, and to correct the error before performing the convolution operation again. In some examples, the method 400 may comprise performing all of the three processes described above in relation to FIGS. 12A, 12B, and, 12C respectively, or performing one of these processes shown in each of FIGS. 12A, 12B, and, 12C at a time, until a source of the error is identified. Where all three processes are performed, they may be performed in a particular sequence. For example, after it is determined that the predicted checksum data 502 and the output checksum data 506 differ in a manner which is indicative of an error, the input feature map 104 may be processed 1212 to generate the input confirmation checksum data 1218, which is compared 1214 with the input checksum data 116. If a difference is identified, then the entire inference may be run again to obtain a replacement for the input feature map 104. The kernel confirmation checksum data 1208 and bias confirmation checksum data 1228 may be determined and compared with the kernel checksum data 118 and bias checksum data 604 respectively. If a difference indicative of an error is identified in either of the kernel 110 or the bias values, then replacements may fetched from the external storage 126 and the entire inference can then be re-run. If no error is identified in any of the input feature map 104, the kernel 110, or the one or more bias values, than the layer may be run again, in other words, that specific convolution operation of the input feature map 104 and the kernel 110 may be run again.

Compression functions may be implemented in the method 400, in particular with respect to the checksum data used to perform error detection. In some examples, the input checksum data is generated using a first compression function and the kernel checksum data is generated using a second compression function. Each of the first and second compression functions implement one or more modulo operations that are used to compress input checksums represented in the input checksum data or kernel checksums represented in the kernel checksum data respectively. A modulo operation is an arithmetic operation in which the output is a remainder resulting from an integer division of a dividend by a divisor. For example, performing a modulo operation on a dividend value, thirteen, using a divisor, five, results in an output of three, because thirteen divided by five is two with a remainder of three. This example modulo operation may be expressed in the form 13mod(5).

The first set of values, the second set of values, and the third set of values described herein may each be represented in data using a bit representation, e.g. 8-bit integer values, enabling values from 0 to 255 to be represented. When generating a checksum from the first set of values, e.g. the input checksum, by summing the first set of values, the data container needed to store the input checksum may be greater than the size of the data containers for storing the first set of values. In some cases, the data container needed to store a checksum of input data can be much greater than that needed to store the input data. For example, where the first set of values are each represented as 8-bit integers, a 32-bit integer may be needed to store the input checksum to avoid data overflow occurring as the data is summed. It is desirable to avoid data overflow errors, which occur when attempting to generate a value that is outside the range of values that are representable with the available bits assigned to store the generated value, as these errors require special handling and can cause bottlenecks in processing. By using modulo operations to compress values when generating the input checksums, kernel checksums, predicted checksums, and output checksums it becomes possible to reduce the storage burden while still performing error detection. Using modulo operations to compress the different types of checksum data may result in reduced protection from errors in some circumstances although this is usually outweighed by the performance increases arising from the increased efficiency. The accuracy of error detection and the increased efficiency provided by using a modulo operation can be tuned as will be described further below.

FIGS. 13A to 13D show various examples of compression functions which may be applied when generating the input checksum data, kernel checksum data, and the predicted checksum data. In the different examples shown, the frequency and order in which modulo operations are performed differs. In each of the examples shown in FIGS. 13A to 13D, obtaining the predicted checksum data includes performing a modulo operation on a predicted checksum value generated by multiplying the input checksum $I_C$ represented in the input checksum data with a kernel checksum $K_C$ represented in the kernel checksum data. If the predicted checksum value is larger than the divisor M, then this modulo operation reduces the size of the predicted checksum data and thereby increases the efficiency of the method 400.

Figure 13A:
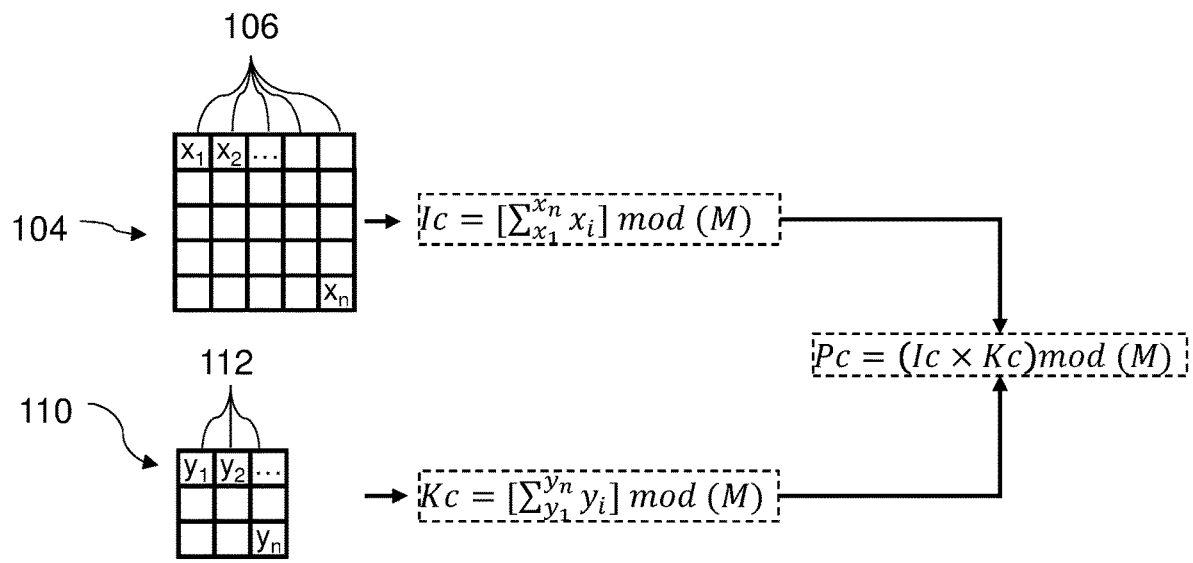
FIG. 13A is schematic diagram showing a first compression function and a second compression function according to examples.

In a first example, shown in FIG. 13A, the first compression function, used when generating the input checksum data, includes calculating a checksum $\Sigma_1^n x_i$ of the first set of values $x_1$ to $x_n$, and then performing a modulo operation, with a divisor "M", on this checksum to obtain an input checksum $I_C$. In this case, the final value for the input checksum is reduced by using the modulo operation and hence a smaller data container may be used to store the input checksum as compared to if the modulo operation had not been performed. However, the example shown in FIG. 13A may not completely remove the need for using a larger data container. When generating the initial checksum $\Sigma_1^n x_i$ a large data container may be used to prevent data overflow, the container subsequently being reduced in size after the modulo operation has been performed. The kernel checksum data may be generated using a similar, second, compression function shown in FIG. 13A.

Figure 13B:
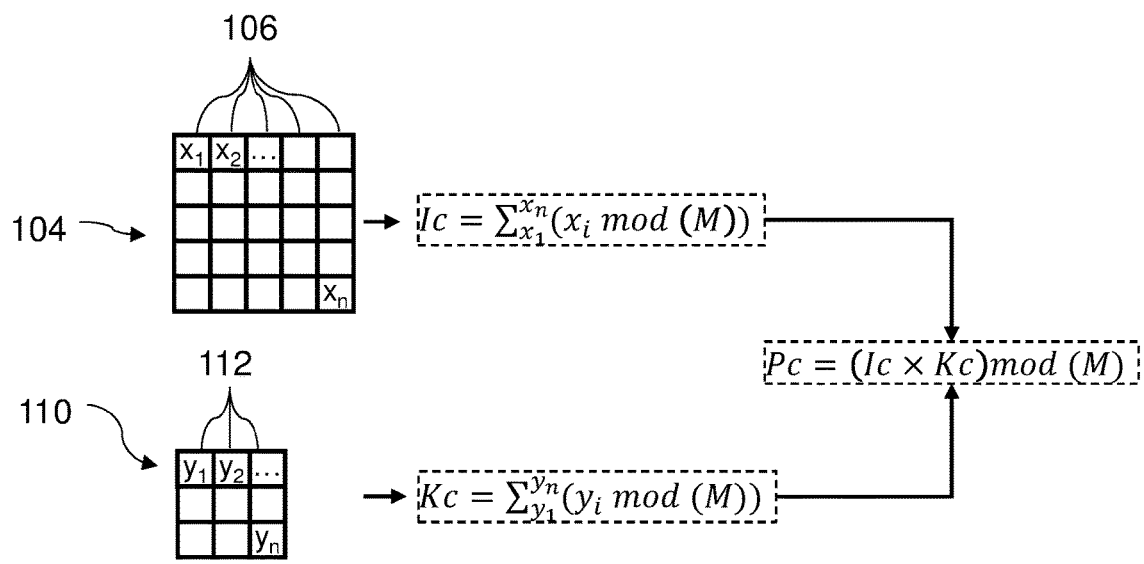
FIG. 13B is schematic diagram showing a first compression function and a second compression function according to examples.

FIG. 13B shows a second example in which the first compression function includes performing a modulo operation on each of the first set of values 106 to obtain a first set of remainder values $x_1$ mod (M) to $x_n$ mod (M), and summing the first set of remainder values to obtain an input checksum $I_C$. In this second example, the size of each of the first set of values 106 may be reduced before summing them to obtain an input checksum for the input checksum data. However, in some cases, the input checksum $I_C$ may still require a larger data container than any of the first set of values 106, in particular, if the remainder values are close to the maximum value which is representable in the data format used to store the first set of values 106.

Figure 13C:
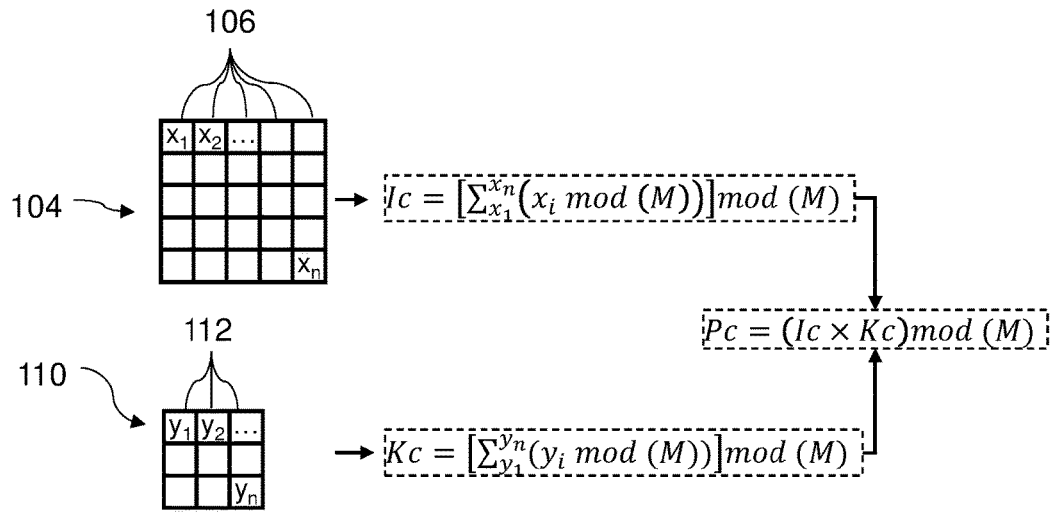
FIG. 13C is schematic diagram showing a first compression function and a second compression function according to examples.

FIG. 13C shows a third example in which the first compression function includes performing a modulo operation on each of the first set of values 106 to obtain a first set of remainder values $x_1$ mod (M) to $x_n$ mod (M), and generating the input checksum by performing a modulo operation on a sum, $\Sigma_{x_1}^{x_n} (x_i \bmod (M))$, of the first set of remainder values. In this way, the size of the values used to generate the input checksum are compressed using a modulo operation during the process and at the end of the process, thereby reducing the likelihood of a data overflow error occurring.

Figure 13D:
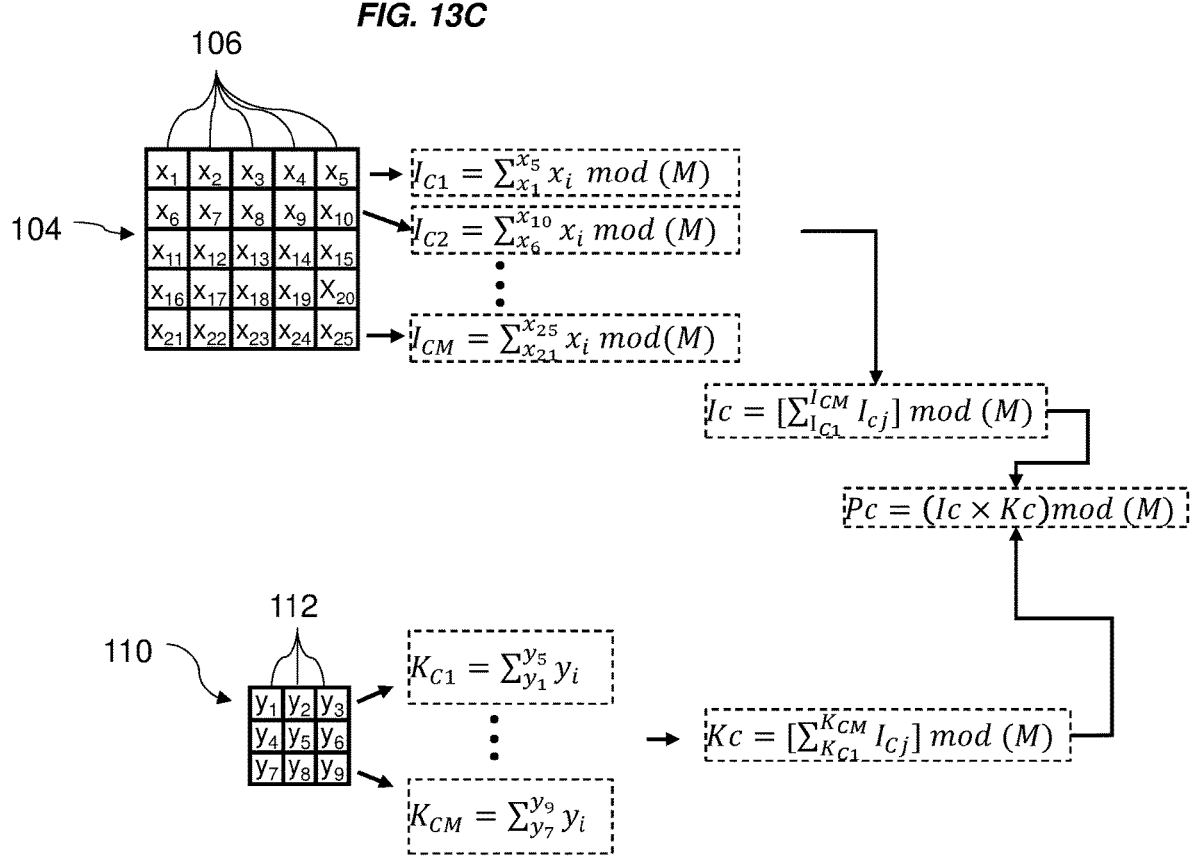
FIG. 13D is schematic diagram showing a first compression function and a second compression function according to examples

In a fourth example, shown in FIG. 13D, the first compression function includes generating one or more intermediate input checksum values $I_{C1}$ to $I_{CM}$, each intermediate input checksum value being generated by performing a modulo operation on a sum of a respective, different, subset of the first set of values 106. In FIG. 13D, each of the different subsets of the first set of values 106 is formed from a row of values in the multi-dimensional array. It will be appreciated, however, that alternative arrangements for the subsets, and an alternative total number of subsets, of the first set of values are also possible. For example, the subsets of the first set of values may be formed from columns in the first multi-dimensional array 108, or may be selected based on other, non-linear, spatial arrangements. By performing the modulo operations on summed subsets of the first set of values 106, the total number of modulo operations needed to be performed, as compared to the examples of FIGS. 13B and 13C, is reduced. The efficacy of the modulo operations in compressing the data values may also be increased as the modulo operations are performed on larger values than in the example shown in FIG. 13C. In this example, the kernel checksum $K_C$ is similarly generated by first generating one or more intermediate kernel checksum values $K_{C1}$ to $K_{CM}$ by performing a modulo operation of a sum of a respective, different, subset of the second set of values 112. A kernel checksum $K_C$ is then generated by performing a modulo operation on a sum of the one or more intermediate kernel checksum values.

As shown in the examples of FIGS. 13A to 13D different arrangements of modulo operations are possible and this is due to the nature of modulo operation, in which the sum of the results from a set of modulo operations performed on a set of values is equal to the modulo operation of the sum of the set of values. As such, other arrangements of sums and modulo operations may also be used to compress the input checksum data, the kernel checksum data, and the predicted checksum data than those shown. In some examples, the specific compression function may be adapted for the hardware used to implement the method 400.

Where the input checksum data, kernel checksum data, or predicted checksum data are generated using a compression function that implements one or more modulo operations, generating the output checksum data may include using a third compression function, implementing one or more modulo operations to compress output checksums represented in the output checksum data. The modulo operations used in the first, second, and third compression functions, and when processing the predicted checksum may implement the same divisor "M" such that the comparison of the output checksum data 506 and the predicted checksum data 116 provide accurate error detection.

The value of the divisor used in the modulo operations shown in FIGS. 13A to 13D, affects the amount of computing power used to perform the modulo operation and an accuracy of error detection provided when using these compression functions. A divisor value which has many factors provides less error detection than a value which has a few factors because the division operation will lead to more complete divisions. However, certain values, such as a number that is a power of two, can reduce the computational expense to perform the modulo operation because bit shifting schemes, or other computing specific schemes can be used to perform the division more quickly. For example, where the values in the input feature map, output feature map, and/or kernel are represented in 8-bit integer representations, then a divisor value of "251" which is a prime, provides strong protection, but is expensive to calculate. In contrast a value 256 allows the modulo operation to be performed computationally cheaply, but at the cost of reduced error protection. In some examples, a divisor value of "255" is used which ensures that the checksum data is kept within the 8-bit range while also maintaining high error detection capabilities and without the computational expense as the prime number "251".

Table 1 below shows the results of a test to determine how many checksum mismatches, in other words a mismatch between the uncompressed predicted checksum and the uncompressed output checksum, are missed, with a trial size of 10,000, when implementing the compression schemes shown in FIG. 13D on 8-bit values using a divisor of M=255.

TABLE 1

Instances of errors missed in checksums scheme where modulo operations using M = 255 is used.

| Input Bit Flips | Kernel Bit Flips | Output Bit Flips | Errors Missed |
| --- | --- | --- | --- |
| 0 | 0 | 1 | 0 |
| 0 | 0 | 2 | 0 |
| 1 | 0 | 0 | 0 |
| 2 | 0 | 0 | 133 |
| 0 | 1 | 0 | 255 |
| 0 | 2 | 0 | 284 |
| 1 | 1 | 0 | 1 |
| 2 | 2 | 0 | 175 |

As can be seen in the results shown in Table 1, in a worst-case scenario, a double or single bit flip in the kernel data will lead to ~3% of data errors getting through. However, the memory footprint improvement in this case is in the order of four times which also leads to downstream performance increases which may greatly outweigh the reduced error detection. Further the likelihood of a double or single bit flip in the kernel is relatively low, due to the small size of the kernel, which may, in a typical case, make up ~5% of the total data usage for a convolutional algorithm.

In some cases, the divisor "M", may be selectable, such that a user can tune the trade-off between compression and error detection accuracy. The selection of the divisor may be dependent on a digital representation used to store the first 106 and second 112 set of values, for example where the values are represented as 8-bit integers a divisor M=255 may be used. In other cases, such as where the values are represented as 10-bit integers, a divisor M=1023 may be used.

While the description of the modulo operations has been provided above with respect to the error detection schemes described with respect to FIG. 4 to FIG. 12 it is to be appreciated that the modulo operations may also be performed in conjunction with more general error detection schemes, such as those described above with respect to FIG. 1 to FIG. 3 in which full padding is used during the convolution operation between the input feature map 104 and the kernel 110. In those cases, the modulo operations may be performed at any of a number stages in the procedure including when generating the checksums 302 and 304, after generating the checksums 302 and 304, after when or after generating the predicted checksum 306 and/or during a comparison of the predicted checksum 306 with the output checksum 308. The numbered clauses provided below include descriptions of various examples relating to the application of the modulo operation to error detection schemes shown in FIG. 1 to FIG. 3.

Figure 14:
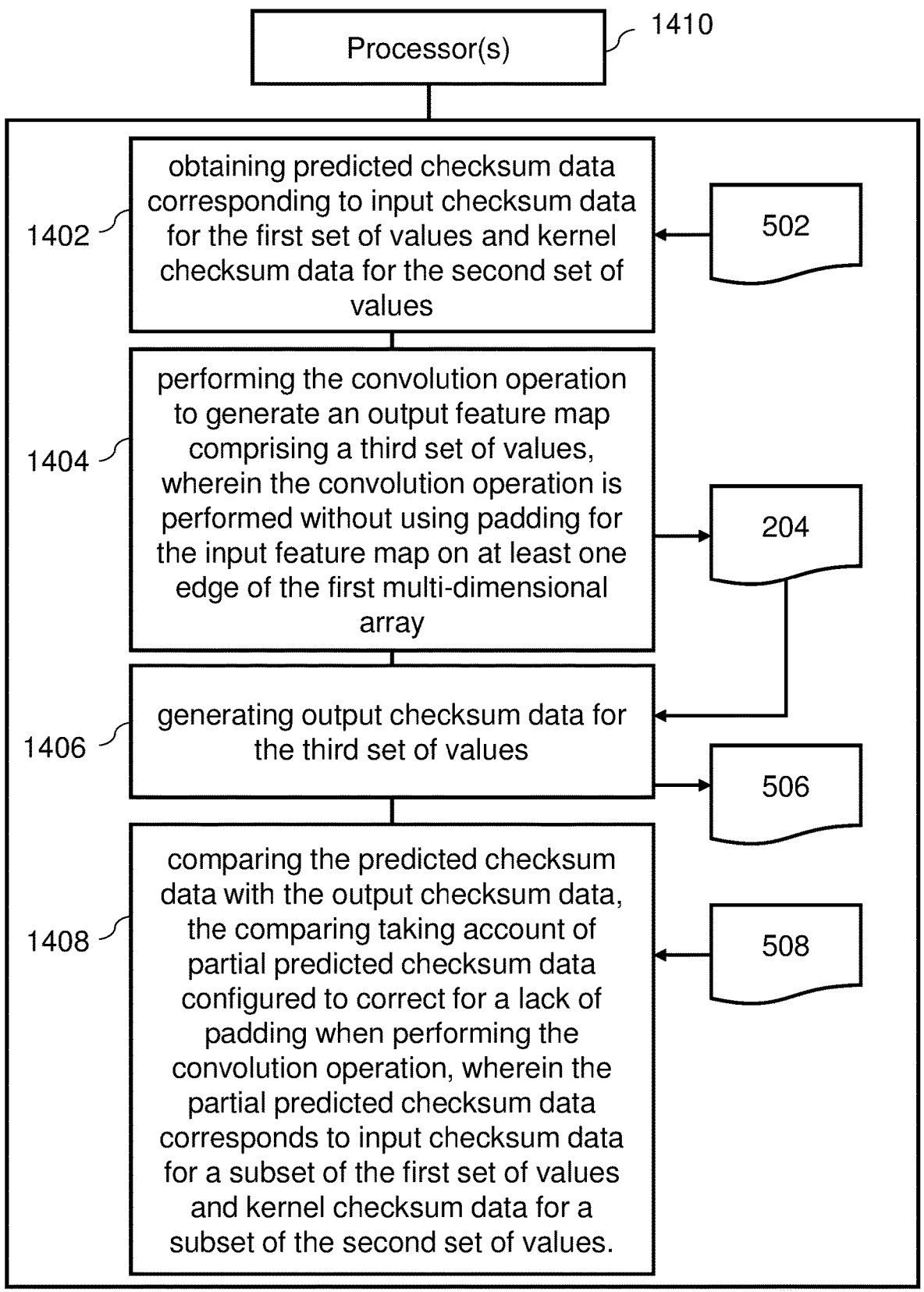
FIG. 14 is a schematic diagram showing a non-transitory computer-readable storage medium according to examples.

According to the example shown in FIG. 14 there is also provided a non-transitory computer-readable storage medium 1400 comprising a set of computer-executable instructions 1402 to 1408 which, when executed by one or more processors 1410 cause the processors 1410 to perform a method 400. The instructions include an instruction 1402 to obtain the predicted checksum data 502 corresponding to input checksum data 116 for the first set of values 106 and kernel checksum data 118 for the second set of values 112. Another instruction 1404, when executed, causes the processors 1410 to perform the convolution operation to generate the output feature map 204 comprising the third set of values 504. A further instruction 1406 causes the processors 1410 to generate output checksum data 506 for the third set of values 504. Another instruction 1408 causes the processors 1410 to compare the predicted checksum data 502 with the output checksum data 506, the comparing taking account of partial predicted checksum data 508 configured to account for a lack of padding when performing the convolution. The partial predicted checksum data 508 corresponds to input checksum data for a subset of the first set of values 106 and kernel checksum data for a subset of the second set of values 112. The lack of padding may be for example, less than k−1 padding, where k−1 padding is where the number of layers of padding used for a given edge of the first multi-dimensional array is equal to one less than the number of elements in a linear arrangement in the kernel that is perpendicular to the given edge of the first multi-dimensional array during convolution.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. For example, while checksums the checksum values described above generally include determining sums of values and/or multiplying these sums with other values, such as for the predicted checksum 306, it is to be understood that other checksum calculations are also possible. The person skilled in the art will appreciate that were different checksum schemes are used to generate any of the input checksum, kernel checksum, bias checksum, or predicted checksum similar changes will need to be made to the output checksum in order to maintain comparability for detecting errors, and vice versa.

Numbered Clauses

The following numbered clauses describe various embodiments of the present disclosure.

1. A computer-implemented method for detecting errors when performing a convolutional operation that involves convolving an input feature map comprising a first set of values represented in a first multi-dimensional array with a kernel comprising a second set of values represented in a second multi-dimensional array, the computer-implemented method comprising:
   generating input checksum data for the first set of values using a first compression function that implements one or more modulo operations to compress input checksum values;
   generating kernel checksum data for the second set of values using a second compression function that implements one or more modulo operations to compress kernel checksum values;
   generating predicted checksum data corresponding to the input checksum data and the kernel checksum data;
   performing the convolution operation to generate an output feature map comprising a third set of values;
   generating output checksum data for the third set of values; and
comparing the predicted checksum data with the output checksum data.

2. The computer-implemented method according to clause 1, wherein generating the predicted checksum data includes performing a modulo operation on a predicted checksum value generated by multiplying an input checksum represented in the input checksum data with a kernel checksum represented in the kernel checksum data.

3. The computer-implemented method according to clause 1, wherein the modulo operations implemented in the first compression function, in the second compression function, and to obtain the predicted checksum data use a common divisor.

4. The computer-implemented method according to clause 3, wherein generating the output checksum data includes using a third compression function that implements one or more modulo operations to compress output checksums represented in the output checksum data.

5. The computer-implemented method according to clause 1, wherein the first compression function includes:
   performing a modulo operation on each of the first set of values to obtain a first set of remainder values; and
   generating the input checksum by performing a modulo operation on a sum of the first set of remainder values.

6. The computer-implemented method according to clause 1, wherein the first compression function includes:
   generating one or more intermediate input checksum values, each intermediate input checksum value being generated by performing a modulo operation on a sum of a respective, different, subset of the first set of values;
   generating the input checksum by performing a modulo operation on a sum of the one or more intermediate input checksum values.

7. The computer-implemented method according to clause 1, wherein the second compression function includes:
   performing a modulo operation on each of the second set of values to obtain second set of remainder values; and
   generating the kernel checksum by performing a modulo operation on a sum of the second set of remainder values.

8. The computer-implemented method according to clause 1, wherein the second compression function includes:
   generating one or more intermediate kernel checksum values, each intermediate kernel checksum value being generated by performing a modulo operation on a sum of a respective, different, subset of the second set of values;
   generating the kernel checksum by performing a modulo operation on a sum of the one or more intermediate kernel checksum values.

9. The computer-implemented method according to clause 3, wherein the divisor is dependent on a digital representation used to store the first and second set of values.

10. The computer-implemented method according to clause 3, wherein the divisor is selectable.

11. A computer-implemented method for detecting errors when performing a convolutional operation that involves convolving an input feature map comprising a first set of values represented in a first multi-dimensional array with a kernel comprising a second set of values represented in a second multi-dimensional array, the computer-implemented method comprising:
   obtaining predicted checksum data corresponding to input checksum data for the first set of values and kernel checksum data for the second set of values;
   performing the convolution operation to generate an output feature map comprising a third set of values;
   generating output checksum data for the third set of values; and
   comparing the predicted checksum data with the output checksum data, the comparing taking account of partial predicted checksum data configured to correct for a lack of padding when performing the convolution operation,
   wherein the partial predicted checksum data corresponds to input checksum data for a subset of the first set of values and kernel checksum data for a subset of the second set of values.

12. The computer-implemented method according to clause 11, wherein the convolution operation is performed without using padding for the input feature map on at least one edge of the first multi-dimensional array.

13. The computer-implemented method according to clause 11, wherein performing the convolution operation comprises modifying the output feature map according to one or more bias values and wherein the predicted checksum data corresponds to the input checksum data, the kernel checksum data, and bias checksum data for the one or more bias values.

14. The computer-implemented method according to clause 13, wherein the bias checksum data is dependent on the one or more bias values and a size of the output feature map.

15. The computer-implemented method according to clause 1, wherein obtaining the predicted checksum data comprises generating the predicted checksum data by multiplying an input checksum represented in the input checksum data and corresponding to a checksum of the first set of values with a kernel checksum represented in the kernel checksum data and corresponding to a checksum of the second set of values.

16. The computer-implemented method according to clause 15 wherein the input checksum data is generated using a first compression function that implements one or more modulo operations to compress input checksums represented in the input checksum data and wherein the kernel checksum data is generated using a second compression function to compress kernel checksums represented in the kernel checksum data.

17. The computer-implemented method according to clause 16, wherein obtaining the predicted checksum data includes performing a modulo operation on a predicted checksum value generated by multiplying the input checksum represented in the input checksum data with a kernel checksum represented in the kernel checksum data.

18. The computer-implemented method according to clause 16, wherein the modulo operations implemented in the first compression function, in the second compression function, and to obtain the predicted checksum data use a common divisor.

19. The computer-implemented method according to clause 18, wherein generating the output checksum data includes using a third compression function that implements one or more modulo operations to compress output checksums represented in the output checksum data, wherein the modulo operations implemented in the third compression function use the common divisor.

20. The computer-implemented method according to clause 16, wherein the first compression function includes:
performing a modulo operation on each of the first set of values to obtain a first set of remainder values; and
generating the input checksum by performing a modulo operation on a sum of the first set of remainder values.

21. The computer-implemented method according to clause 16, wherein the first compression function includes:
generating one or more intermediate input checksum values, each intermediate input checksum value being generated by performing a modulo operation on a sum of a respective, different, subset of the first set of values;
generating the input checksum by performing a modulo operation on a sum of the one or more intermediate input checksum values.

22. The computer-implemented method according to clause 16, wherein the second compression function includes:
performing a modulo operation on each of the second set of values to obtain second set of remainder values; and
generating the kernel checksum by performing a modulo operation on a sum of the second set of remainder values.

23. The computer-implemented method according to clause 16, wherein the second compression function includes:
generating one or more intermediate kernel checksum values, each intermediate kernel checksum value being generated by performing a modulo operation on a sum of a respective, different, subset of the second set of values;
generating the kernel checksum by performing a modulo operation on a sum of the one or more intermediate kernel checksum values.

24. The computer-implemented method according to clause 18, wherein the divisor is dependent on a digital representation used to store the first and second set of values.

25. The computer-implemented method according to clause 18, wherein the divisor is selectable.

26. The computer-implemented method according to clause 11, wherein if a difference between the predicted checksum data and the output checksum data that is indicative of an error is identified when comparing the predicted checksum data with the output checksum data, the computer-implemented method comprises:
processing the input feature map to determine input confirmation checksum data;
comparing the input checksum data with the input confirmation checksum data; and
if a difference between the input checksum data and the input confirmation checksum data that is indicative of an error in the input feature map is identified, obtaining a replacement for the input feature map; and 27. The computer-implemented method according to clause 11, wherein if a difference between the predicted checksum data and the output checksum data that is indicative of an error is identified when comparing the predicted checksum data with the output checksum data, the computer-implemented method comprises:
processing the kernel to determine kernel confirmation checksum data;
comparing the kernel checksum data with the kernel confirmation checksum data; and
if a difference between the kernel checksum data and the kernel confirmation checksum data that is indicative of an error in the kernel is identified, fetching a replacement for the kernel.

28. The computer-implemented method according to clause 13, wherein if a difference between the predicted checksum data and the output checksum data is identified when comparing the predicted checksum data with the output checksum data, the computer-implemented method comprises:
processing the one or more bias values to determine bias confirmation checksum data;
comparing the bias checksum data to the bias confirmation checksum data; and
if a difference between the bias checksum data and the bias confirmation checksum data that is indicative of an error in the one or more bias values is identified, fetching a replacement for the one or more bias values.

29. The computer-implemented method according to clause 11, wherein the partial predicted checksum data includes at least one partial predicted checksum value and a said partial predicted checksum value is generated by:
determining one or more input correction checksums based on a first linear array of values from the first set of values, the first linear array having an arrangement adjacent to a said edge of the first multi-dimensional array;
determining one or more kernel correction checksums based on a second linear array of values from the second set of values, the second linear array corresponding in arrangement to the arrangement of the first linear array; and
generating the at least one partial predicted checksum value by processing the one or more input correction checksums with the one or more kernel correction checksums to account for the lack of padding used when performing the convolution operation.

30. The computer-implemented method according to clause 11, wherein the partial predicted checksum data includes at least one partial predicted checksum value and a said partial predicted checksum value is generated by:
identifying a first linear array of values from the first set of values, the first linear array having an arrangement adjacent to a said edge of the first multi-dimensional array;
identifying a second linear array of values from the second set of values, the second linear array corresponding in arrangement to the arrangement of the first linear array; and
convolving the first linear array of values with the second linear array of values to produce the said partial predicted checksum value.

31. The computer-implemented method according to clause 29, wherein the at least one partial predicted checksum value includes a first partial predicted checksum value for a first edge generated according to claim 19 and a second partial predicted checksum value for a second, perpendicular, edge generated according to claim 19, wherein the method comprises generating an overcorrection value based on the first set of values and the second set of values, and wherein the comparing the predicted checksum data with the output checksum data takes account of the partial predicted checksum data and the overcorrection value.

32. A data processing system comprising one or more compute modules for performing convolutions between an input feature map comprising a first set of values represented in a first multi-dimensional array and a kernel comprising a second set of values represented in a second multi-dimensional array, the data processing system being configured to:
  obtain predicted checksum data corresponding to input checksum data for the first set of values and kernel checksum data for the second set of values;
  perform a convolution operation on the input feature map with the kernel using the compute modules to obtain an output feature map comprising a third set of values;
  generate output checksum data for the third set of values; and
  compare the predicted checksum data with the output checksum data, the comparing taking account partial predicted checksum data configured to correct for a lack of padding when performing the convolution operation,
  wherein the partial predicted checksum data corresponds to input checksum data for a subset of the first set of values and kernel checksum data for a subset of the second set of values.

33. The data processing system according to clause 32, wherein the data processing system comprises an interface for obtaining data from external storage, and wherein obtaining the predicted checksum data comprises:
  obtaining the kernel checksum data for the second set of values using the interface;
  obtaining indication data using the interface, wherein the indication data identifies data representing the input feature map that is to be used to generate the input checksum data;
  generating the input checksum data based on the indication data and the input feature map; and
  processing the input checksum data and the kernel checksum data to generate the predicted checksum data.

34. The data processing system according to clause 33, wherein if it is determined that an error is present based on a result of the comparing the predicted checksum data with the output checksum data, the data processing system is further configured to perform at least one of:
  a first process comprising:
    process the input feature map to generate input confirmation checksum data;
    compare the input checksum data with the input confirmation checksum data; and
    if the input checksum data is different to the input confirmation checksum data, obtain a replacement for the input feature map using the interface; and a second process comprising:
    process the kernel to generate kernel confirmation checksum data;
    compare the kernel checksum data with the kernel confirmation checksum data; and
    if the kernel checksum data is different to the kernel confirmation checksum data, obtain a replacement for the kernel using the interface.

35. The data processing system according to clause 33, wherein the data processing system is configured to modify the output feature map according to on one or more bias values, and wherein the predicted checksum data corresponds to the input checksum data, the kernel checksum data, and bias checksum data for the one or more bias values.

36. The data processing system according to clause 35, wherein the bias checksum data is obtained using the interface, and wherein the predicted checksum data is generated by processing the input checksum data, the kernel checksum data, and the bias checksum data.

37. The data processing system according to clause 32, wherein the partial predicted checksum data includes at least one partial predicted checksum value and the data processing system is configured to determine a said partial predicted checksum value by:
  determining one or more input correction checksums based on a first linear array of values from the first set of values, the first linear array having an arrangement adjacent to a said edge of the first multi-dimensional array;
  determining one or more kernel correction checksums based on a second linear array of values from the second set of values, the second linear array corresponding in arrangement to the arrangement of the first linear array; and
  generating the said partial predicted checksum value by processing the one or more input correction checksums with the one or more kernel correction checksums to account for the lack of padding used when performing the convolution operation.

38. The data processing system according to clause 32, the partial predicted checksum data includes at least one partial predicted checksum value and the data processing system is configured to determine a said partial predicted checksum value by:
  identifying a first linear array of values from the first set of values, the first linear array having an arrangement adjacent to a said edge of the first multi-dimensional array;
  identifying a second linear array of values from the second set of values, the second linear array corresponding in arrangement to the arrangement of the first linear array; and
  convolving the first linear array of values with the second linear array of values to produce the said partial predicted checksum value.

39. The data processing system according to clause 32, wherein if is determined that no error is present based on a result of the comparing the predicted checksum data with the output checksum data, the data processing system is configured to select the output checksum data to be further input checksum data for a convolutional operation in which the output feature map is used as an input feature map.

40. A non-transitory computer-readable storage medium comprising computer-executable instructions which, when executed by one or more processors, cause the one or more processors to:
  obtain an input feature map comprising a first set of values represented in a first multi-dimensional array and a kernel comprising a second set of values represented in a second multi-dimensional array, wherein the input feature map is associated with input checksum data and the kernel is associated with kernel checksum data;

obtain predicted checksum data corresponding to the input checksum data and the kernel checksum data;

perform a convolution operation on the input feature map with the kernel to obtain an output feature map comprising a third set of values;

generate output checksum data for the third set of values; and compare the predicted checksum data with the output checksum data, the comparing taking account of partial predicted checksum data configured to correct for a lack of padding when performing the convolution operation, wherein the partial predicted checksum data corresponds to input checksum data for a subset of the first set of values and kernel checksum data for a subset of the second set of values.

What is claimed is:

1. A computer-implemented method of detecting errors for a data processing system when implementing a neural network comprising performing a convolutional operation that involves convolving an input feature map comprising a first set of values represented in a first multi-dimensional array with a kernel comprising a second set of values represented in a second multi-dimensional array, the computer-implemented method comprising:

obtaining the input feature map and first input checksum data from storage using an interface, the first input checksum data representing an input checksum corresponding to a checksum of the first set of values;

obtaining the kernel and first kernel checksum data from the storage using the interface, the first kernel checksum data representing a kernel checksum corresponding to a checksum of the second set of values;

obtaining predicted checksum data representing a predicted checksum by multiplying the input checksum with the kernel checksum;

performing the convolution operation to generate an output feature map comprising a third set of values wherein the convolution operation is performed without using padding for the input feature map on at least one edge of the first multi-dimensional array;

generating output checksum data representing an output checksum of the third set of values;

comparing the predicted checksum data with the output checksum data, the comparing taking account of partial predicted checksum data configured to correct for a lack of padding when performing the convolution operation, wherein the partial predicted checksum data comprises at least one partial predicted checksum value and the partial predicted checksum data corresponds to second input checksum data for a subset of the first set of values and second kernel checksum data for a subset of the second set of values;

identifying a difference between the predicted checksum and the output checksum that is indicative of an error based on the comparing of the predicted checksum data with the output checksum data, the difference taking account of the at least one partial predicted checksum value;

performing a predetermined action in-response-to address the identified difference between the predicted checksum and the output checksum and obtain an updated output feature map; and provide the updated output feature map for use as an input to a subsequent operation of the neural network.

2. The computer-implemented method according to claim 1 wherein the input checksum data is generated using a first compression function that implements one or more modulo operations to compress input checksums represented in the input checksum data and wherein the kernel checksum data is generated using a second compression function to compress kernel checksums represented in the kernel checksum data.

3. The computer-implemented method according to claim 2, wherein obtaining the predicted checksum data includes performing a modulo operation on a predicted checksum value generated by multiplying the input checksum represented in the input checksum data with a kernel checksum represented in the kernel checksum data.

4. The computer-implemented method according to claim 2, wherein the first compression function includes: performing a modulo operation on each of the first set of values to obtain a first set of remainder values; and generating the input checksum by performing a modulo operation on a sum of the first set of remainder values.

5. The computer-implemented method according to claim 2, wherein the first compression function includes: generating one or more intermediate input checksum values, each intermediate input checksum value being generated by performing a modulo operation on a sum of a respective, different, subset of the first set of values; generating the input checksum by performing a modulo operation on a sum of the one or more intermediate input checksum values.

6. The computer-implemented method according to claim 2, wherein the second compression function includes: performing a modulo operation on each of the second set of values to obtain second set of remainder values; and generating the kernel checksum by performing a modulo operation on a sum of the second set of remainder values.

7. The computer-implemented method according to claim 2, wherein the second compression function includes: generating one or more intermediate kernel checksum values, each intermediate kernel checksum value being generated by performing a modulo operation on a sum of a respective, different, subset of the second set of values; generating the kernel checksum by performing a modulo operation on a sum of the one or more intermediate kernel checksum values.

8. The computer-implemented method according to claim 1, wherein the predetermined action comprises: processing the input feature map to determine input confirmation checksum data; comparing the input checksum data with the input confirmation checksum data; and if a difference between the input checksum data and the input confirmation checksum data that is indicative of an error in the input feature map is identified, obtaining a replacement for the input feature map.

9. The computer-implemented method according to claim 1, wherein the predetermined action comprises:

processing the kernel to determine kernel confirmation checksum data;

comparing the kernel checksum data with the kernel confirmation checksum data; and if a difference between the kernel checksum data and the kernel confirmation checksum data that is indicative of an error in the kernel is identified, fetching a replacement for the kernel.

10. The computer-implemented method according to claim 1, wherein a said partial predicted checksum value is generated by:

determining one or more input correction checksums based on a first linear array of values from the first set of values, the first linear array having an arrangement adjacent to a said edge of the first multi-dimensional array; determining one or more kernel correction checksums based on a second linear array of values from the second set of values, the second linear array corresponding in arrangement to the arrangement of the first linear array; and generating the at least one partial predicted checksum value by processing the one or more input correction checksums with the one or more kernel correction checksums to account for the lack of padding used when performing the convolution operation.

11. The computer-implemented method according to claim 1, wherein a said partial predicted checksum value is generated by:
identifying a first linear array of values from the first set of values, the first linear array having an arrangement adjacent to a said edge of the first multi-dimensional array; identifying a second linear array of values from the second set of values, the second linear array corresponding in arrangement to the arrangement of the first linear array; and convolving the first linear array of values with the second linear array of values to produce the said partial predicted checksum value.

12. The computer-implemented method according to claim 10, wherein the at least one partial predicted checksum value includes a first partial predicted checksum value for a first edge generated according to claim 10 and a second partial predicted checksum value for a second, perpendicular, edge generated according to claim 10, wherein the method comprises generating an overcorrection value based on the first set of values and the second set of values, and wherein the comparing the predicted checksum data with the output checksum data takes account of the partial predicted checksum data and the overcorrection value.

13. A data processing system comprising an interface and one or more compute modules for implementing a neural network comprising performing convolutions between an input feature map comprising a first set of values represented in a first multi-dimensional array and a kernel comprising a second set of values represented in a second multi-dimensional array, the data processing system comprising one or more processors being configured to:
obtain the input feature map and first input checksum data from storage using the interface, the first input checksum data representing an input checksum corresponding to a checksum of the first set of values;
obtain the kernel and first kernel checksum data from the storage using the interface, the first kernel checksum data representing a kernel checksum corresponding to a checksum of the second set of values;
obtain predicted checksum data representing a predicted checksum by multiplying the input checksum with the kernel checksum;
perform a convolution operation on the input feature map with the kernel using the compute modules to obtain an output feature map comprising a third set of values, wherein the convolution operation is performed without using padding for the input feature map on at least one edge of the first multi-dimensional array;
generate output checksum data representing an output checksum of the third set of values;
compare the predicted checksum data with the output checksum data, the comparing taking account partial predicted checksum data configured to correct for a lack of padding when performing the convolution operation, wherein the partial predicted checksum data comprises at least one partial predicted checksum value and the partial predicted checksum data corresponds to second input checksum data for a subset of the first set of values and second kernel checksum data for a subset of the second set of values, the partial predicted checksum data comprising at least one partial predicted checksum value;
identify a difference between the predicted checksum and the output checksum that is indicative of an error based on the comparing of the predicted checksum data with the output checksum data, the difference taking account of the at least one partial predicted checksum value;
perform a predetermined action to address the identified difference between the predicted checksum and the output checksum and obtain an updated output feature map; and
provide the updated output feature map for use as an input to a subsequent operation of the neural network.

14. The data processing system according to claim 13, wherein obtaining the predicted checksum data comprises: obtaining the kernel checksum data for the second set of values using the interface; obtaining indication data using the interface, wherein the indication data identifies data representing the input feature map that is to be used to generate the input checksum data; generating the input checksum data based on the indication data and the input feature map; and processing the input checksum data and the kernel checksum data to generate the predicted checksum data.

15. The data processing system according to claim 14, wherein the predetermined action comprises at least one of: a first process comprising: process the input feature map to generate input confirmation checksum data; compare the input checksum data with the input confirmation checksum data; and if the input checksum data is different to the input confirmation checksum data, obtain a replacement for the input feature map using the interface; and a second process comprising: process the kernel to generate kernel confirmation checksum data; compare the kernel checksum data with the kernel confirmation checksum data; and if the kernel checksum data is different to the kernel confirmation checksum data, obtain a replacement for the kernel using the interface.

16. The data processing system according to claim 13, wherein the data processing system is configured to determine a said partial predicted checksum value by:
determining one or more input correction checksums based on a first linear array of values from the first set of values, the first linear array having an arrangement adjacent to a said edge of the first multi-dimensional array;
determining one or more kernel correction checksums based on a second linear array of values from the second set of values, the second linear array corresponding in arrangement to the arrangement of the first linear array; and
generating the said partial predicted checksum value by processing the one or more input correction checksums with the one or more kernel correction checksums to account for the lack of padding used when performing the convolution operation.

17. The data processing system according to claim 13, wherein the data processing system is configured to determine a said partial predicted checksum value by:
identifying a first linear array of values from the first set of values, the first linear array having an arrangement adjacent to a said edge of the first multi-dimensional array;

identifying a second linear array of values from the second set of values, the second linear array corresponding in arrangement to the arrangement of the first linear array; and convolving the first linear array of values with the second linear array of values to produce the said partial predicted checksum value.

18. A non-transitory computer-readable storage medium comprising computer-executable instructions which, when executed by one or more processors, cause the one or more processors to:

obtain an input feature map comprising a first set of values represented in a first multi-dimensional array and a kernel comprising a second set of values represented in a second multi-dimensional array, from storage;

obtain first input checksum data from the storage, the first input checksum data representing an input checksum corresponding to a checksum of the first set of values;

obtain first kernel checksum data from the storage the first kernel checksum data representing a kernel checksum corresponding to a checksum of the second set of values;

obtain predicted checksum data representing a predicted checksum by multiplying the input checksum with the kernel checksum;

perform a convolution operation on the input feature map with the kernel to obtain an output feature map comprising a third set of values, wherein the convolution operation is performed without using padding for the input feature map on at least one edge of the first multi-dimensional array;

generate output checksum data representing an output checksum of the third set of values;

compare the predicted checksum data with the output checksum data, the comparing taking account of partial predicted checksum data configured to correct for a lack of padding when performing the convolution operation, wherein the partial predicted checksum data comprising at least one partial predicted checksum value and the partial predicted checksum data corresponds to second input checksum data for a subset of the first set of values and second kernel checksum data for a subset of the second set of values;

identify a difference between the predicted checksum and the output checksum that is indicative of an error based on the comparing of the predicted checksum data with the output checksum data, the difference taking account of the at least one partial predicted checksum value;

perform a predetermined action to address the identified difference between the predicted checksum and the output checksum and obtain an updated output feature map; and provide the updated output feature map for use as an input to a subsequent operation of the neural network.

19. The computer-implemented method of claim 1, wherein the predetermined action comprises repeating the convolution operation to obtain the updated output feature map.

20. The computer-implemented method of claim 19, wherein the predetermined action comprises, prior to repeating the convolution operation to obtain the updated output feature map, at least one of: obtaining a replacement for the input feature map; or obtaining a replacement for the kernel.

* * * * *